US009424683B2

United States Patent
Katou

(10) Patent No.: US 9,424,683 B2
(45) Date of Patent: Aug. 23, 2016

(54) TRANSPOSING APPARATUS, TRANSPOSING METHOD, AND COMPUTER PRODUCT

(71) Applicant: FUJITSU LIMITED, Kawasaki-shi (JP)

(72) Inventor: Tomoki Katou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 407 days.

(21) Appl. No.: 13/750,117

(22) Filed: Jan. 25, 2013

(65) Prior Publication Data

US 2013/0241924 A1 Sep. 19, 2013

(30) Foreign Application Priority Data

Mar. 19, 2012 (JP) .................................. 2012-062285

(51) Int. Cl.
G06T 15/00 (2011.01)
G06T 15/10 (2011.01)
G06F 7/78 (2006.01)
G06F 17/14 (2006.01)

(52) U.S. Cl.
CPC .............. *G06T 15/10* (2013.01); *G06F 7/785* (2013.01); *G06F 17/142* (2013.01)

(58) Field of Classification Search
CPC ....... G06T 19/00; G06T 17/20; G06T 17/00; G06T 15/10; G06T 15/00
USPC ........................................................ 345/419
See application file for complete search history.

(56) References Cited

U.S. PATENT DOCUMENTS

| 8,060,313 | B2 | 11/2011 | Takeuchi |
| 2010/0023728 | A1 | 1/2010 | El-Mahdy et al. |
| 2011/0302590 | A1 | 12/2011 | Kanemura |

FOREIGN PATENT DOCUMENTS

| JP | 2004-54642 | 2/2004 |
| JP | 2005-252009 | 9/2005 |

(Continued)

OTHER PUBLICATIONS

"High Performance Parallel Computing for FDTD Numerical Technique in Electromagnetic Calculations for SAR Distribution Inside Human Head" (by Eldeeb, H., Elsadek, H., Dessokey, M., Abdallah, H., and Bagherzadeh, N., in Latest Trends on Computers (vol. I), published in Jul. 2010).*

(Continued)

*Primary Examiner* — Ke Xiao
*Assistant Examiner* — Gordon Liu
(74) *Attorney, Agent, or Firm* — Staas & Halsey LLP

(57) ABSTRACT

A transposing apparatus is configured by a computer controlling a computing device having computing elements arranged into a matrix and memory devices connected to the computing elements. The computing device executes an electromagnetic field analysis process on latticed three-dimensional analysis subject data present in a three-dimensional coordinate system. The computer is configured to detect the number of lined-up lattices in a direction of a first axis, in a direction of a second axis, and in a direction of a third axis of the coordinate system, through detection on the three-dimensional analysis subject data; transpose a group of lattices of the three-dimensional analysis subject data, based on the detected numbers of lined-up lattices and on the number of lined-up computing elements in a row direction and in a column direction; and output to the computing device, the three-dimensional analysis subject data transposed.

7 Claims, 16 Drawing Sheets

(56) References Cited

FOREIGN PATENT DOCUMENTS

| | | |
|---|---|---|
| JP | 2010-198564 | 9/2010 |
| JP | 4644740 | 12/2010 |

OTHER PUBLICATIONS

"Physis: An Implicitly Parallel Programming Model for Stencil Computations on Large-Scale GPU-Accelerated Supercomputers" (by Maruyama, N., Nomura, T., Sato, K., and Matsuoka, S., in SC11 Nov. 12-18, 2011).*

An Implementation of Parallel 3-D FFT with 2-D Decomposition on a Massively Parallel Cluster of Multi-core Processors (by Daisuke Takahashi, in PPAM 2009, Part I, LNCS 6067, pp. 606-614, 2010).*

"Selected Problems of Scheduling Tasks in Multiprocessor Computer Systems" (Instytut Informatyki, Politechnika Poznanska, Poznan, 1997, by Maciej Drozdowski).*

Miyazaki et al., "Electromagnetic Scattering Analysis by FDTD Parallel Computing Using PC Grid Network", Institute of Electronics, Information and Communication Engineers Technical Research Reports, Institute of Electronics, Information and Communication Engineers, Feb. 10, 2015, vol. 104, No. 658, pp. 25-30.

Japanese Office Action dated Aug. 25, 2015 in corresponding Japanese Patent Application No. 2012-062285, 4 pages.

Anthony Chan et al., "Communication Analysis of Parallel 3D FFT for Flat Cartesian Meshes on Large Blue Gene Systems", Dec. 17, 2008, HiPC 2008, LNCS 5374, pp. 350-364, 2008, Springer-Verlag Berlin Heidelberg 2008, XP019113026.

Michael F. Crowley et al., "Adventures in Improving the Scaling and Accuracy of a Parallel Molecular Dynamics Program", The Journal of Supercomputing, vol. 11, No. 3, 1997, pp. 255-278, XP000724660.

Extended European Search Report dated Jan. 8, 2016 in corresponding European Patent Application No. 13150596.8, 8 pages.

* cited by examiner

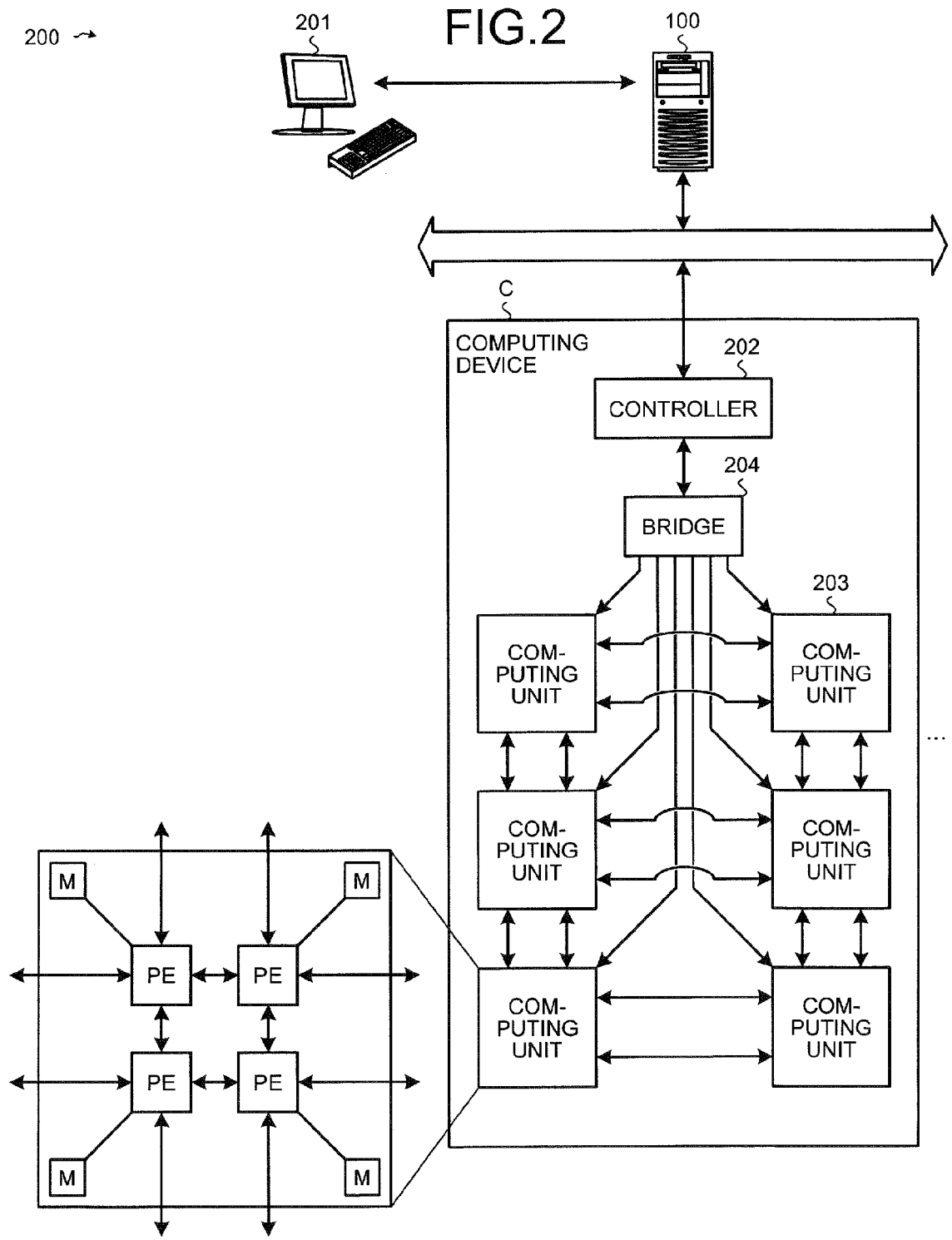

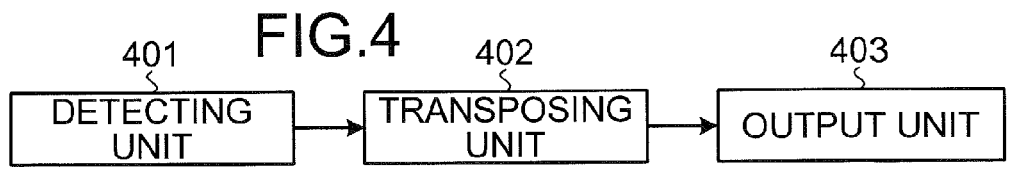
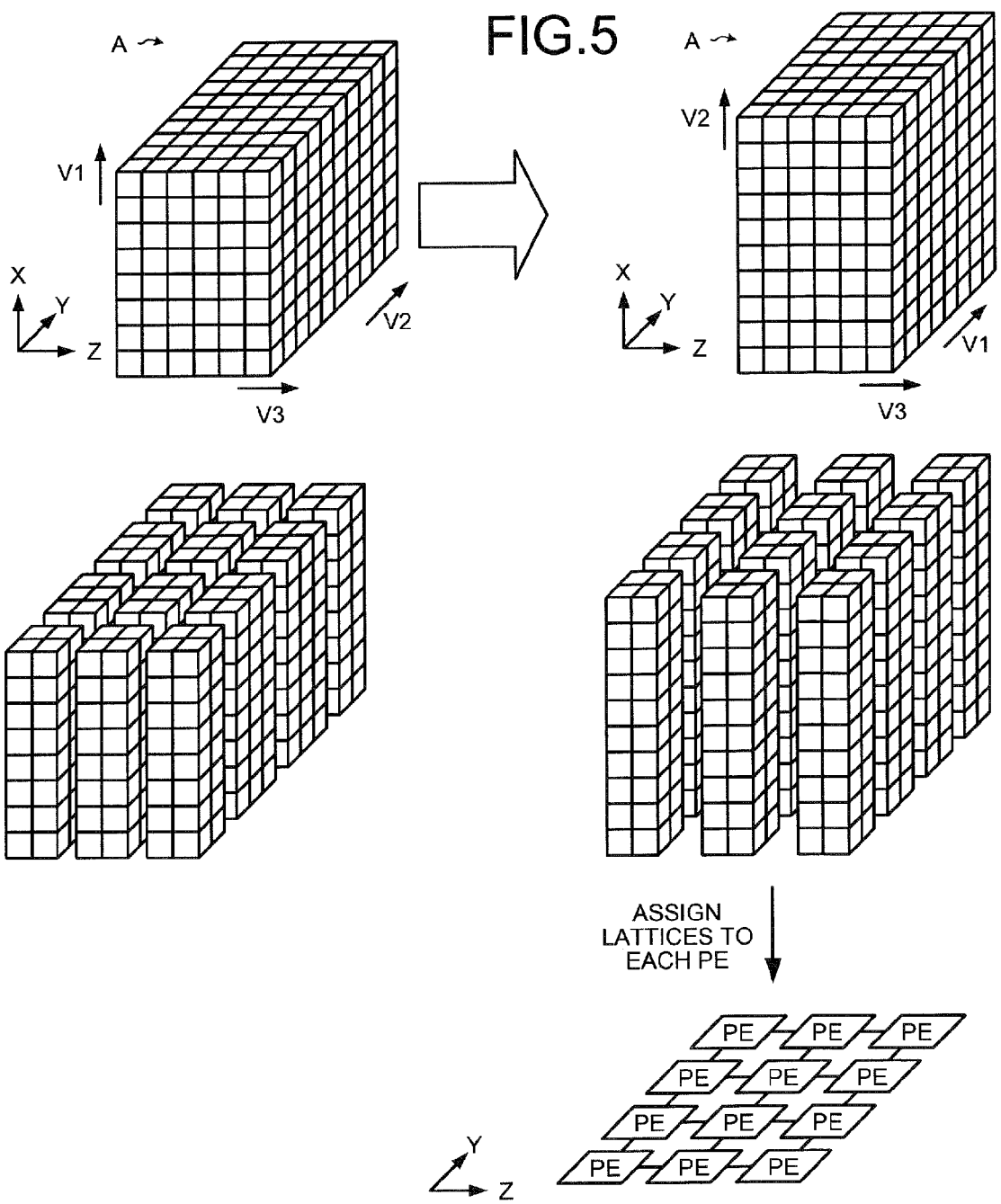

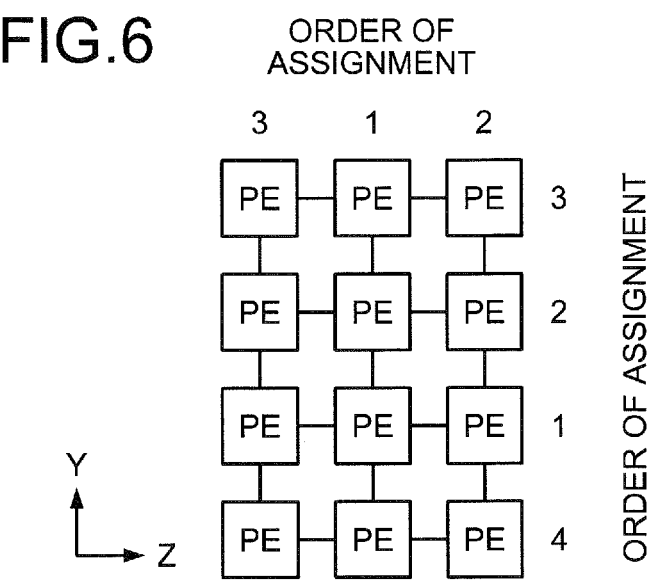

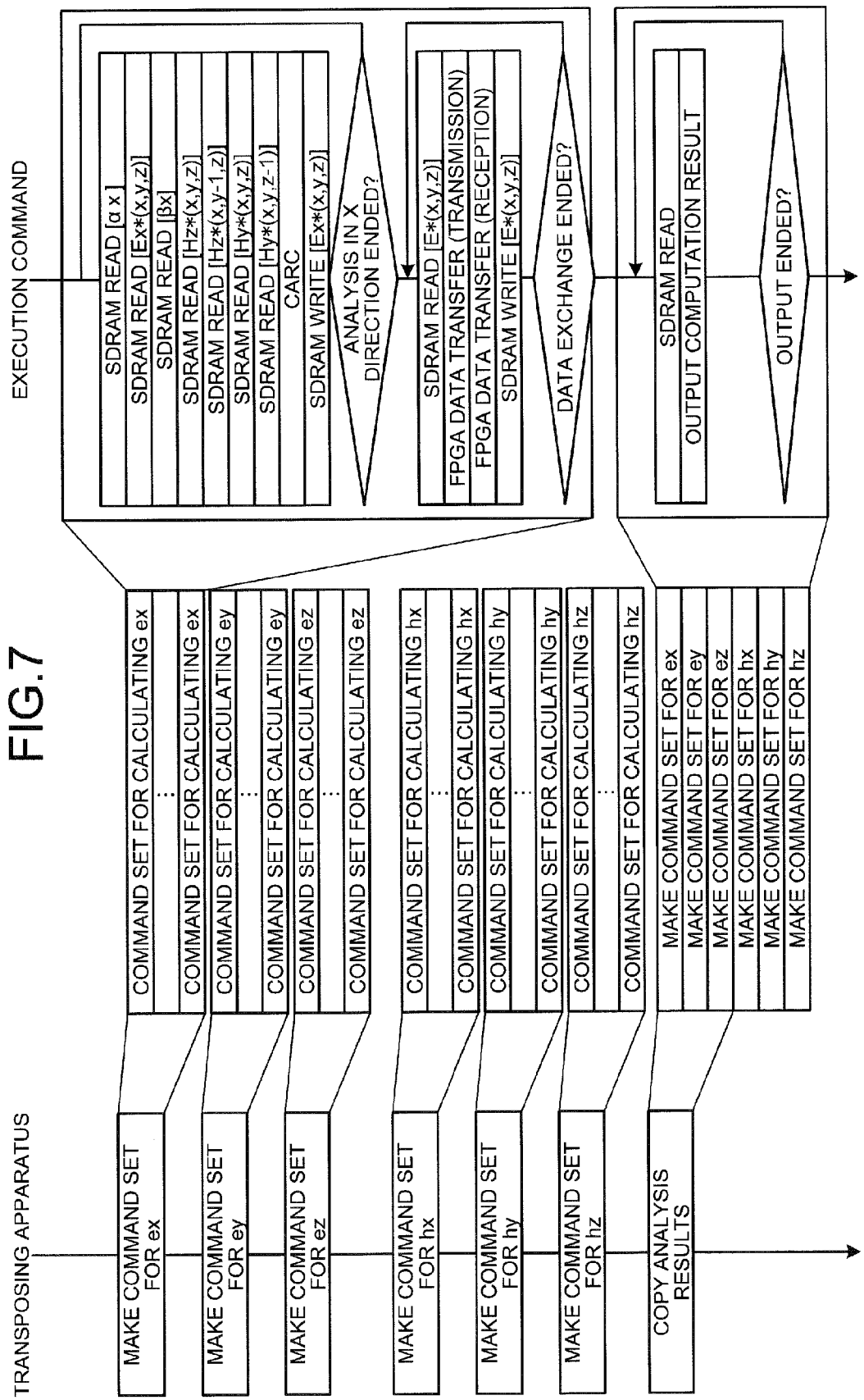

▨ DATA EXCHANGE AREA IN Z DIRECTION
▧ DATA EXCHANGE AREA IN Y DIRECTION
▩ DATA EXCHANGE AREA IN YZ DIRECTION

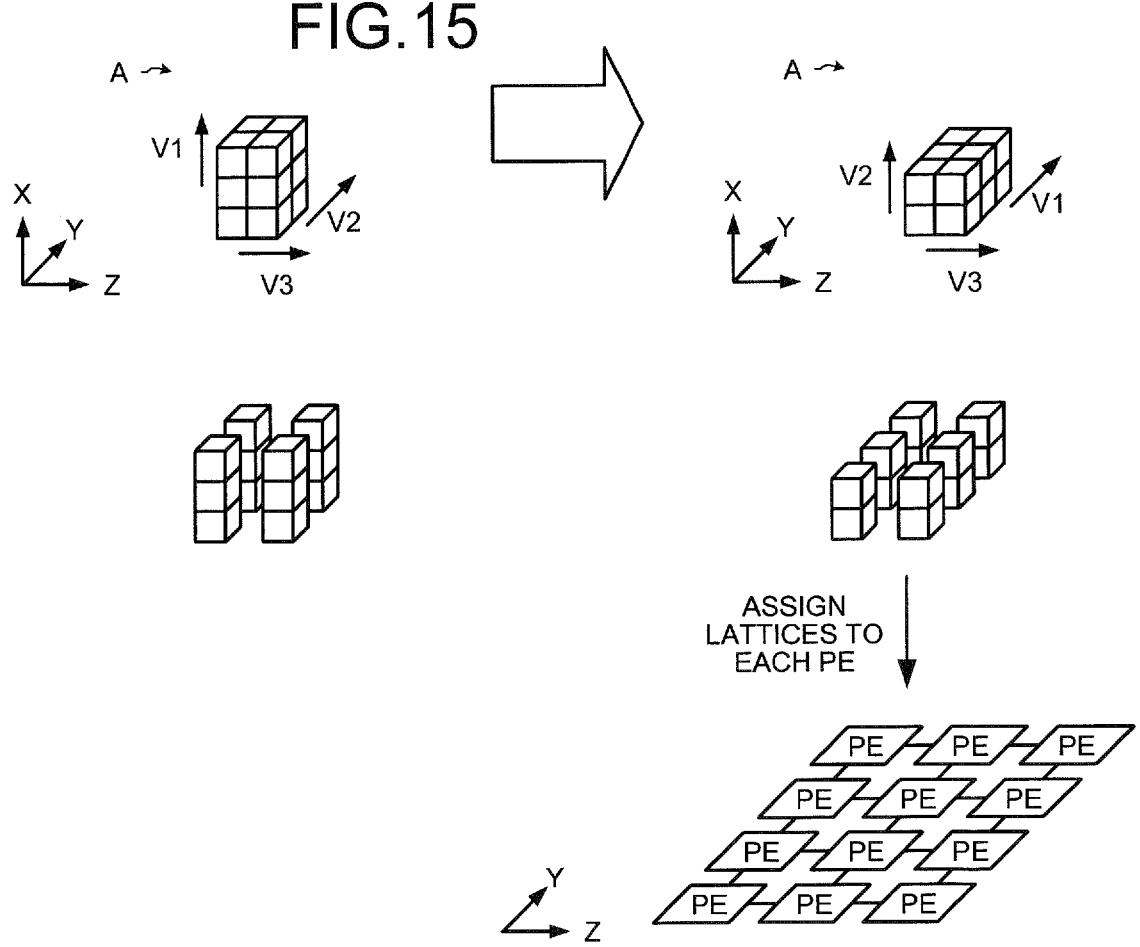

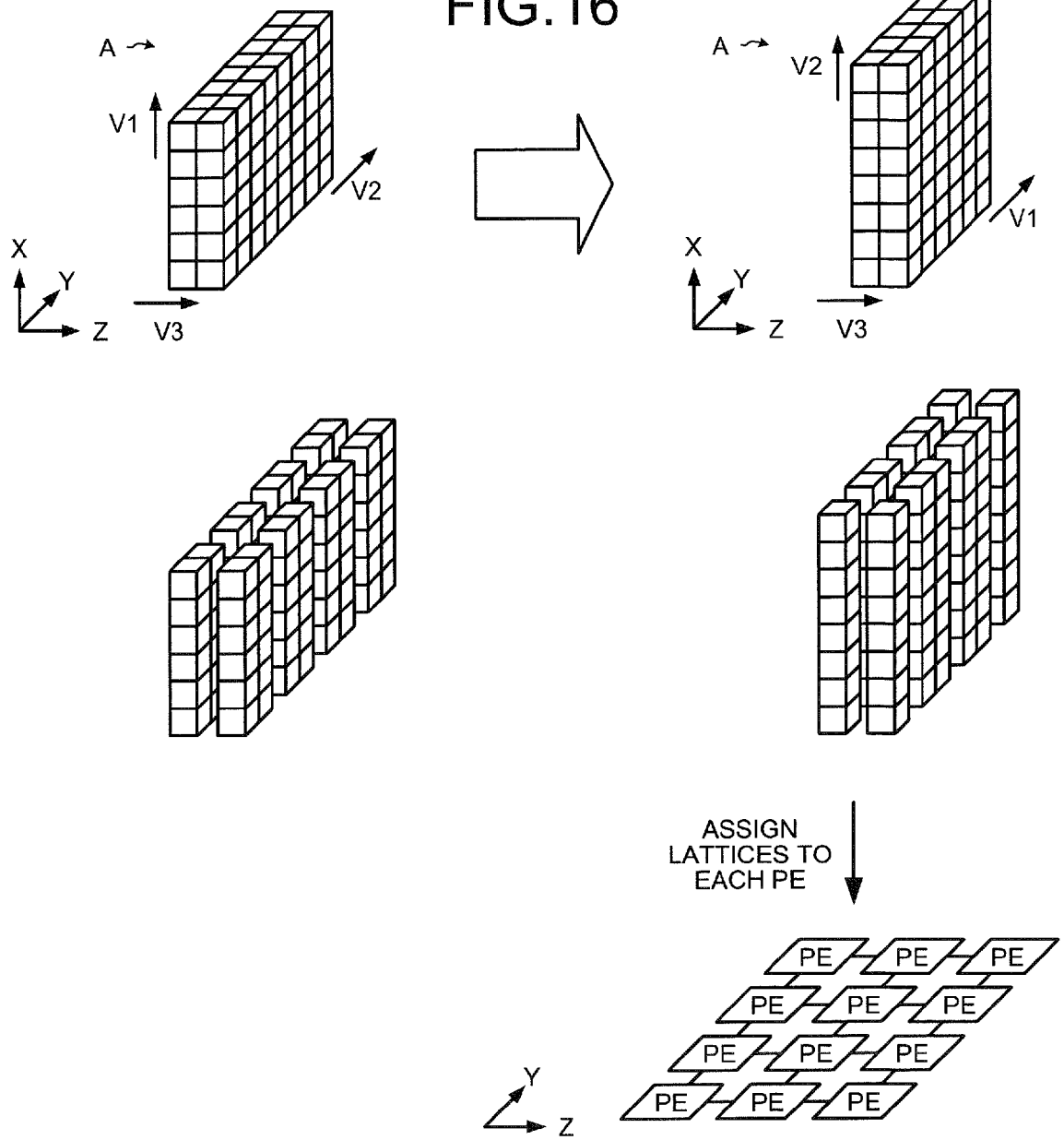

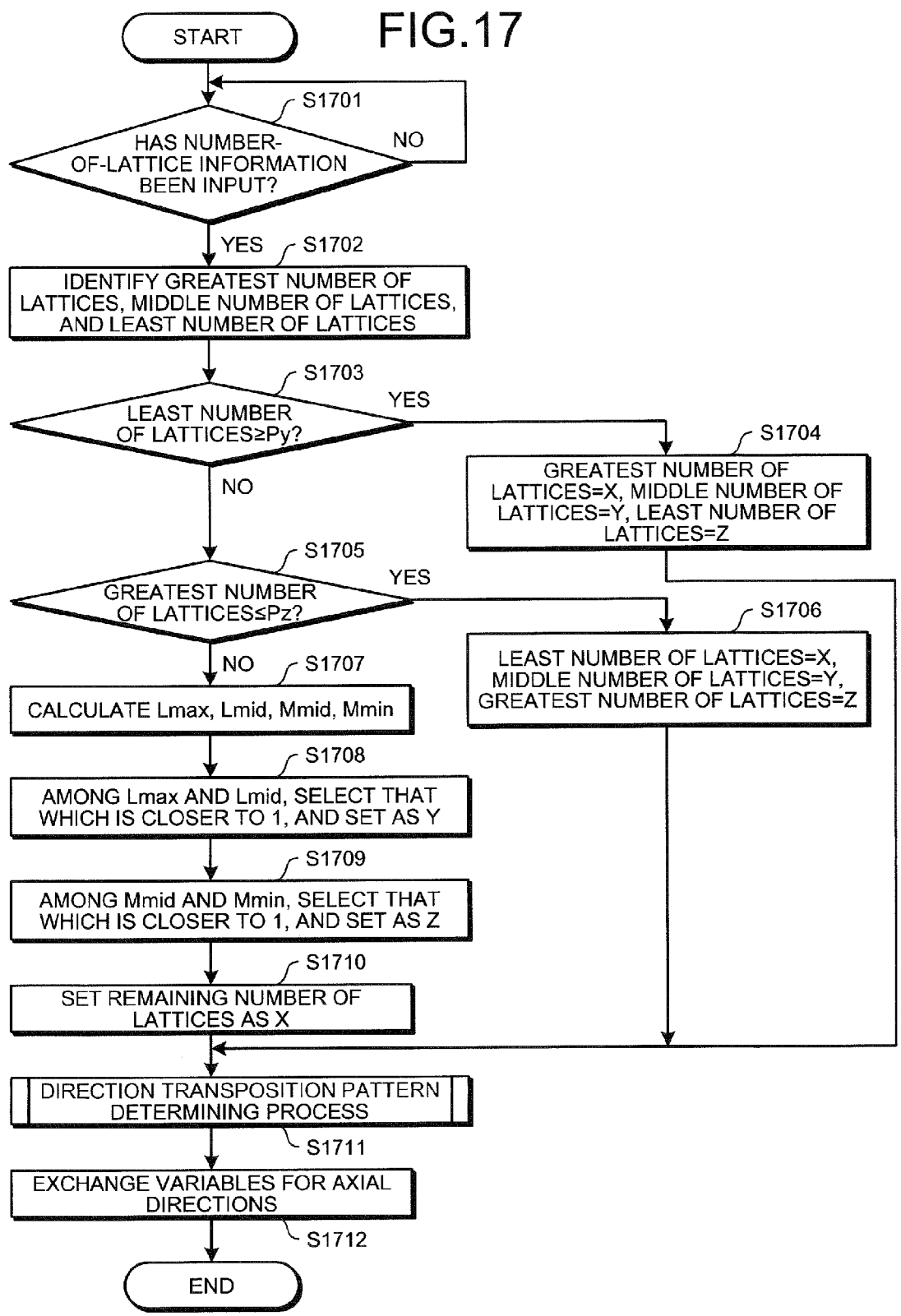

TRANSPOSING APPARATUS, TRANSPOSING METHOD, AND COMPUTER PRODUCT

CROSS REFERENCE TO RELATED APPLICATIONS

This application is based upon and claims the benefit of priority of the prior Japanese Patent Application No. 2012-062285, filed on Mar. 19, 2012, the entire contents of which are incorporated herein by reference.

FIELD

The embodiment discussed herein is related to a transposing apparatus, a transposing method, and a transposing program.

BACKGROUND

The finite-differential time-domain (FDTD) method has been known as one method for performing electromagnetic field analysis in a three-dimensional analysis space. The FDTD method is a method of expanding the Maxwell's equation into a difference equation in a time-space area and solving the expanded difference equation to calculate the value of an electromagnetic field in the analysis space.

In the execution of the FDTD method, multiple information processors may perform parallel computation to realize efficient computation. In such a case, two information processors, to which computation by the FDTD method for adjacent two spaces are assigned, exchange calculation results with each other.

A conventional technique is known of measuring the computation capability of each information processor by simulation, dividing the analysis space according to the computation capability of each information processor, respectively assigning each resulting analysis space to the information processors, and causing the information processors to perform parallel computation by the FDTD method to perform electromagnetic field analysis (see, e.g., Japanese Laid-Open Patent Publication No. 2004-54642).

Another related technique is known of dividing an analysis space into a mesh of subdivided spaces, assigning the subdivided spaces to information processors, and causing the information processors to execute parallel computation by the Monte Carlo method to simulate a state of distribution of particles in multiple areas (see, e.g., Japanese Laid-Open Patent Publication No. 2005-252009). Further, another related technique is known of improving the efficiency of application of the FDTD method to a circuit (see, e.g., Japanese Patent No. 4644740)

With the above techniques, however, multiple information processors connected so that communication between prescribed processors is prevented may be caused to execute parallel computation by the FDTD method. In this case, computations by the FDTD method for two adjacent spaces are assigned to two information processors connected enabling mutual communication, potentially leading to the presence of an information processor to which no computation by the FDTD method is assigned, depending on the shape of the analysis space.

Further, with the above techniques, multiple information processors connected to allow communication between arbitrary processors may be caused to execute parallel computation by the FDTD method. In this case, to exchange computation results between two information processors to which computations by the FDTD method for two adjacent spaces are assigned, a router that controls the connection between the two information processors executes a routing process. This routing process increases the time waited for completion of computation result exchange between the information processors and thus, may increase the time consumed for computation by the FDTD method.

SUMMARY

According to one aspect of the present invention a transposing apparatus includes a computer that controls a computing device having computing elements arranged into a matrix formation and memory devices each connected to each computing element. The computing device executes an electromagnetic field analysis process on latticed three-dimensional analysis subject data present in a three-dimensional coordinate system. The computer is configured to detect the number of lined-up lattices in a direction of a first axis of the three-dimensional coordinate system, the number of lined-up lattices in a direction of a second axis of the coordinate system, and the number of lined-up lattices in a direction of a third axis of the coordinate system, through detection on the three-dimensional analysis subject data; transpose a group of lattices of the three-dimensional analysis subject data, based on the detected numbers of lined-up lattices and on the number of lined-up computing elements in a row direction and the number of lined-up computing elements in a column direction among the computing elements; and output to the computing device, the three-dimensional analysis subject data transposed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an explanatory diagram of one example of an electromagnetic field analyzing system according to an embodiment;

FIG. 4 is a block diagram of an example of a functional configuration of the transposing apparatus 100;

FIG. 5 is an explanatory diagram of a working example 1 of transposition of data of an analysis space A by the transposing apparatus 100;

FIG. 6 is an explanatory diagram of the order of assignment of surplus unit spaces B;

FIG. 7 is an explanatory diagram of one example of an execution command string;

FIGS. 15 and 16 are explanatory diagrams of a working example 2 of transposition of data of the analysis space A by the transposing apparatus 100; and FIG. 17 is a flowchart of a procedure of the transposing process by the transposing apparatus 100 according to the working example 2.

DESCRIPTION OF EMBODIMENTS

Figure 1A:
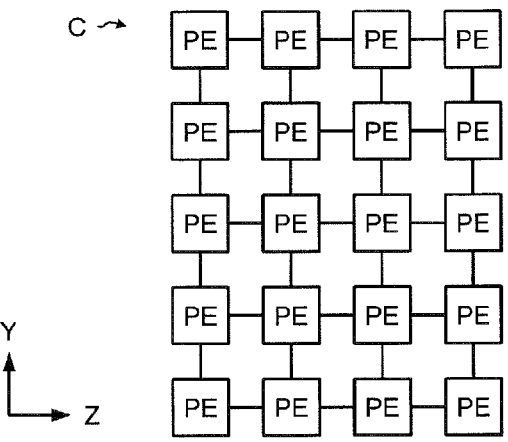
FIGS. 1A and 1B are explanatory diagrams of an example of transposition of data of an analysis space by a transposing apparatus.

Embodiments of a transposing apparatus, a transposing method, and a transposing program according to the present invention will be described in detail, referring to the accompanying drawings. The transposing apparatus is a computer that divides data of an analysis space set in a three-dimensional rectangular coordinate system along the x-axis and Y-axis, assigns the resulting spaces to multiple computing elements, and causes the computing elements to execute parallel computation for electromagnetic field analysis of the analysis space by an FDTD method.

Each computing element has a memory device that holds an electromagnetic field value, which is equivalent to a computation result by the electromagnetic field analysis. For the electromagnetic field analysis by the FDTD method, each computing element acquires the value of the electromagnetic field at a past point of time. Each computing element acquires from another computing element, the value of the electromagnetic field for a past point in time on the Y-axis and Z-axis along which the analysis space is divided, and can acquire from the memory device of the computing element, the value of the electromagnetic field for a past point in time on the X-axis along which the analysis space is not divided. In this manner, each computing element can calculate the value of the electromagnetic field along the direction of the x-axis efficiently from the values of the electromagnetic field in directions along the Y-axis and Z-axis.

Thus, the transposing apparatus transposes data of the analysis space so that the direction in which the size of the analysis space is the greatest matches the X-axis direction in which the computing elements can perform efficient calculation. The transposing apparatus then divides the post-transposition analysis space along the Y-axis and Z-axis, assigns the resulting spaces to multiple computing elements, and causes the computing elements to execute parallel computation for the electromagnetic field analysis. Through this process, the transposing apparatus increases the processing volume for the electromagnetic field analysis along the direction of the X-axis, in which the computing elements performs efficient calculation, and reduces the processing volume for the electromagnetic field analysis along the directions of the Y-axis and the Z-axis. As a result, the computing elements can reduce the time consumed for the electromagnetic field analysis of the post-transposition analysis space to a period less than the time consumed for the electromagnetic field analysis of the pre-transposition analysis space.

In the above case, the transposing apparatus divides the analysis space along the Y-axis and X-axis and allows the computing elements to calculate the values of the electromagnetic field on the X-axis more efficiently than the values of the electromagnetic field along the directions of other axes. However, configuration is not limited hereto. For example, the transposing apparatus may divide the analysis space along the X-axis and Y-axis, in which case the computing elements can calculate the values of the electromagnetic field on the Z-axis more efficiently than the values of the electromagnetic field along the directions of other axes.

Figure 1B:
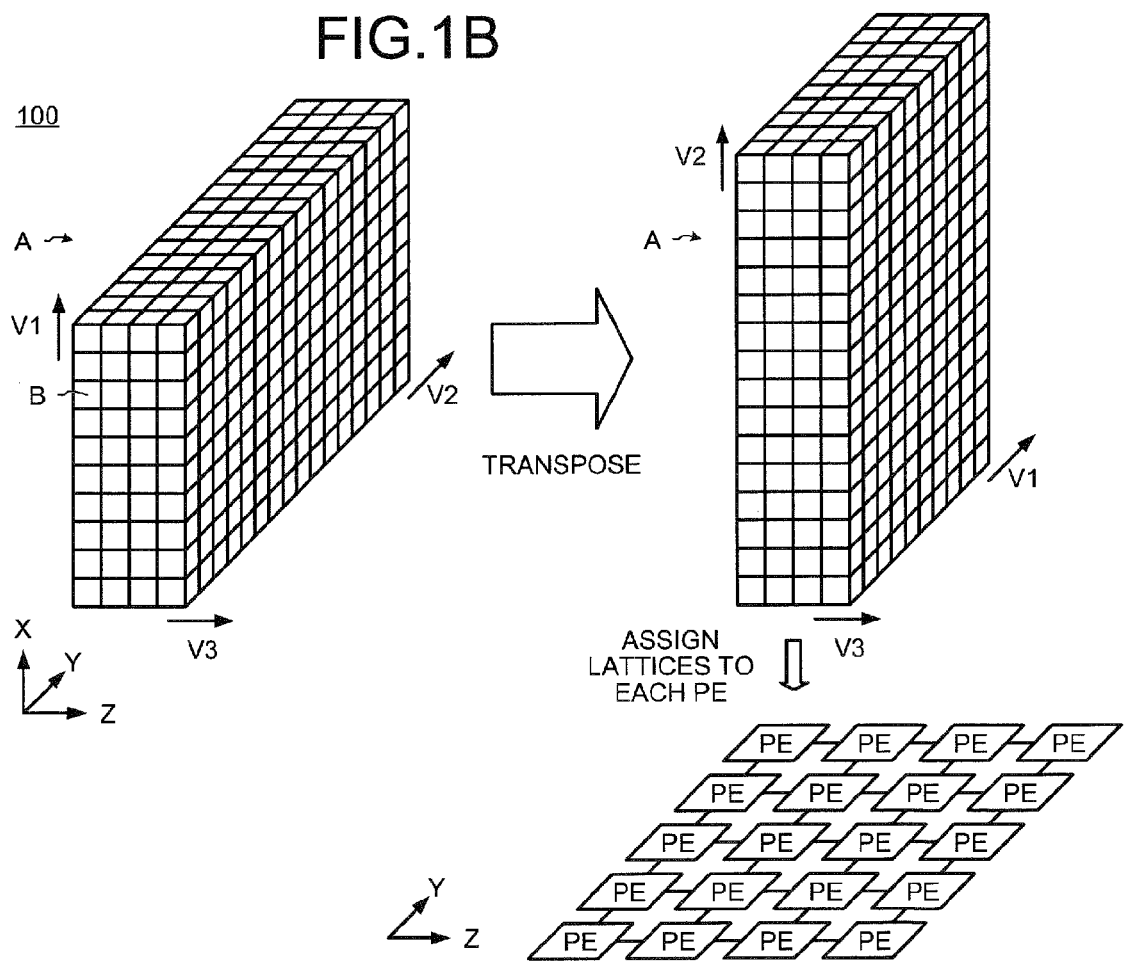

FIGS. 1A and 1B are explanatory diagrams of an example of transposition of data of an analysis space by the transposing apparatus. In FIGS. 1A and 1B, a transposing apparatus 100 causes a computing device C having multiple computing elements PE to execute parallel computation for electromagnetic field analysis by the FDTD method, for an analysis space A present in a three-dimensional rectangular coordinate system and thereby, performs the electromagnetic field analysis for the analysis space A. The analysis space A is a set of unit spaces B present in the three-dimensional rectangular coordinate system represented by the X-axis, Y-axis, and Z-axis. The unit space B is a so-called "Yee lattice". The length of one side of the unit space B is expressed in terms of, for example, meter.

FIG. 1A depicts one example of the computing device C having multiple computing elements PE, by which computing device C executes parallel computation for the electromagnetic field analysis. In FIG. 1A, the multiple computing elements PE of the computing device C are arranged into a "5-line/4-column" two-dimensional matrix. Each computing element PE is connected to another computing element PE adjacent thereto. Each computing element PE has a memory device that serves as a memory area and that holds a computation result by the electromagnetic field analysis. A computation result by the electromagnetic field analysis represents the value of an electromagnetic field at a given coordinate in the analysis space A.

Each computing element can calculate the value of the electromagnetic field on the X-axis direction more efficiently than the values of the electromagnetic field along the directions of the Y-axis and Z-axis. Hereinafter, the X-axis direction in which the value of the electromagnetic field is calculated efficiently is expressed as the X-axis direction in which the efficiency of the electromagnetic field analysis is improved.

FIG. 1B depicts an example of transposition of data of the analysis space A by the transposing apparatus 100. In FIG. 1B, the analysis space A is a set of unit spaces B made up of 10 unit spaces B stacked in a direction V1, 16 unit spaces B stacked in a direction V2, and 4 unit spaces B stacked in a direction V3. Before transposition by the transposing apparatus 100, the analysis space A is placed in the three-dimensional coordinate system such that the direction V matches the X-axis directialong the direction V2 matches the Y-axis direction, and the direction V3 matches the Z-axis direction Hereinafter, the number of unit spaces in each of the directions V1 to V3 is expressed as the number of lattices in each of the directions V1 to V3. When the number of lattices in the V1 direction is "10", the number of lattices in the V2 direction is "16", and the number of lattices in the V3 direction is "4", the numbers of lattices in respective directions V1 to V3 are expressed as "10, 16, 4". When the analysis space A is placed in the three-dimensional coordinate system, the numbers of lattices in the directions V1 to V3 each matching each axial direction are expressed as the numbers of lattices in respective axial directions. When the number of lattices in the X-axis direction is "10", the number of lattices in the Y-axis direction is "16", and the number of lattices in the Z-axis direction is "4", the numbers of lattices in respective axial directions are expressed as "10, 16, 4".

The transposing apparatus 100 transposes data of the analysis space A so that the direction in which the size of the analysis space A is the greatest becomes the X-axis direction in which the efficiency of the electromagnetic field analysis is improved. Data of the analysis space A are variables for an electromagnetic field in each of the unit spaces B in the analysis space A. The transposing apparatus 100 then divides the post-transposition analysis space A by lattices configured by cells respectively corresponding to the arrangement position of each of the computing elements PE, and causes each computing element PE to execute the electromagnetic field analysis of a space present in a corresponding cell.

The transposing apparatus 100 identifies, for example, the greatest number of lattices "16" among the numbers of lattices "10, 16, 4" in respective directions V1 to V3 of the analysis space A, thereby identifies the direction V2 in which the number of lattices is the greatest. The transposing apparatus 100 exchanges variables for the electromagnetic field along the direction V2, for variables for the electromagnetic field along the direction V1 matching the X-axis direction so that the identified direction V2 becomes the X-axis direction in which the efficiency of the electromagnetic field analysis is improved and thereby, transposes data of the analysis space A. Hence, the transposing apparatus 100 transposes the data of the analysis space A in which the numbers of lattices in respective axial directions of the three-dimensional coordinate system are "10, 16, 4" into data of the analysis space A in which the numbers of lattices in respective axial directions of the three-dimensional coordinate system are "16, 10, 4".

The transposing apparatus 100 divides the post-transposition analysis space A by the lattices configured by cells corresponding to the arrangement positions of the computing elements PE, into spaces in the divided cells. The transposing apparatus 100 assigns to each computing element PE, the spaces in the cell corresponding to the arrangement position of the computing element PE, and causes the computing element PE to execute the electromagnetic field analysis of the assigned spaces.

For example, the transposing apparatus 100 divides the analysis space A in which the numbers of lattices in respective axial directions are "16, 10, 4" into 20 spaces with the numbers of lattices of "16, 2, 1" so that the divided spaces correspond to a "5-line/4-column" matrix of the computing elements PE. In this case, the row direction and the column direction of the matrix of the computing elements PE correspond to the Y-axis direction and the Z-axis direction, respectively. The transposing apparatus 100 assigns a space corresponding to the arrangement position of each computing element PE, to each computing element PE and causes the computing element PE to execute the electromagnetic field analysis of the assigned space.

Through this process, the transposing apparatus 100 increases the processing volume for the electromagnetic field analysis along the X-axis direction in which the computing elements PE performs efficient calculation, and reduces the processing volume for the electromagnetic field analysis along the directions of the Y-axis and the Z-axis. As a result, the computing elements can reduce the time consumed for the electromagnetic field analysis of the post-transposition analysis space A to a period shorter than the time consumed for the electromagnetic field analysis of the pre-transposition analysis space A.

The transposing apparatus 100 may transpose data of the analysis space A so that the utilization efficiency of the computing elements PE is improved, based on the number of computing elements PE in the row direction and the number of computing elements PE in the column direction. An example of transposing data of the analysis space A so that the utilization efficiency of the computing elements PE is improved will be described later, referring to FIG. 5 or FIGS. 14 and 15.

FIG. 2 is an explanatory diagram of one example of an electromagnetic field analyzing system according to an embodiment. An electromagnetic field analyzing system 200 includes the transposing apparatus 100, one or multiple computing devices C, and a user terminal 201. The transposing apparatus 100 is connected to the computing devices C and to the user terminal 201.

The transposing apparatus 100 receives a coordinate value of the pre-transposition analysis space A and an electromagnetic field value at the coordinate from the user terminal 201. The transposing apparatus 100 then exchanges variables for the electromagnetic field in respective axial directions, using the numbers of computing elements PE in the row direction and in the column direction and the numbers of lattices in respective axial directions, thereby transposing data of the analysis space A. The transposing apparatus 100 divides the post-transposition analysis space A by lattices configured by cells corresponding to the arrangement position of each of the computing elements PE, and causes each computing element PE to execute the electromagnetic field analysis of a space present in the cell corresponding to the arrangement position of the computing element PE.

The computing device C has a controller 202 and computing units 203, which are connected via a bridge 204, respectively. The controller 202 receives data of spaces divided by the transposing apparatus 100, and assigns the divided spaces to computing elements PE. Each computing unit 203 includes computing elements PE arranged in a matrix formation. The computing units 203 execute electromagnetic field analysis of assigned spaces using data of the assigned spaces. Each computing element PE has a memory device M used as a work area or as an area where a computation result by the electromagnetic field analysis is stored.

The user terminal 201 receives a coordinate value of the analysis space A and the value of an electromagnetic field for the coordinate that are sent from the user of the user terminal 201. The user terminal 201 transmits the received coordinate value of the analysis space A and the value of the electromagnetic field for the coordinate, to the transposing apparatus 100.

In this example, the computing unit 203 includes 4 computing elements PE arranged in a matrix formation. However, configuration is not limited hereto. The computing unit 203, for example, may include 6 computing elements PE arranged in a matrix formation. The computing device C includes 6 computing units 203, thus including 24 computing elements PE. However, configuration is not limited hereto. The computing device C, for example, may include a single computing unit 203 having 24 computing elements 24, or may include 12 computing units 203 each having 2 computing elements PE, or may include computing elements PE of which the number is not 24.

Figure 3:
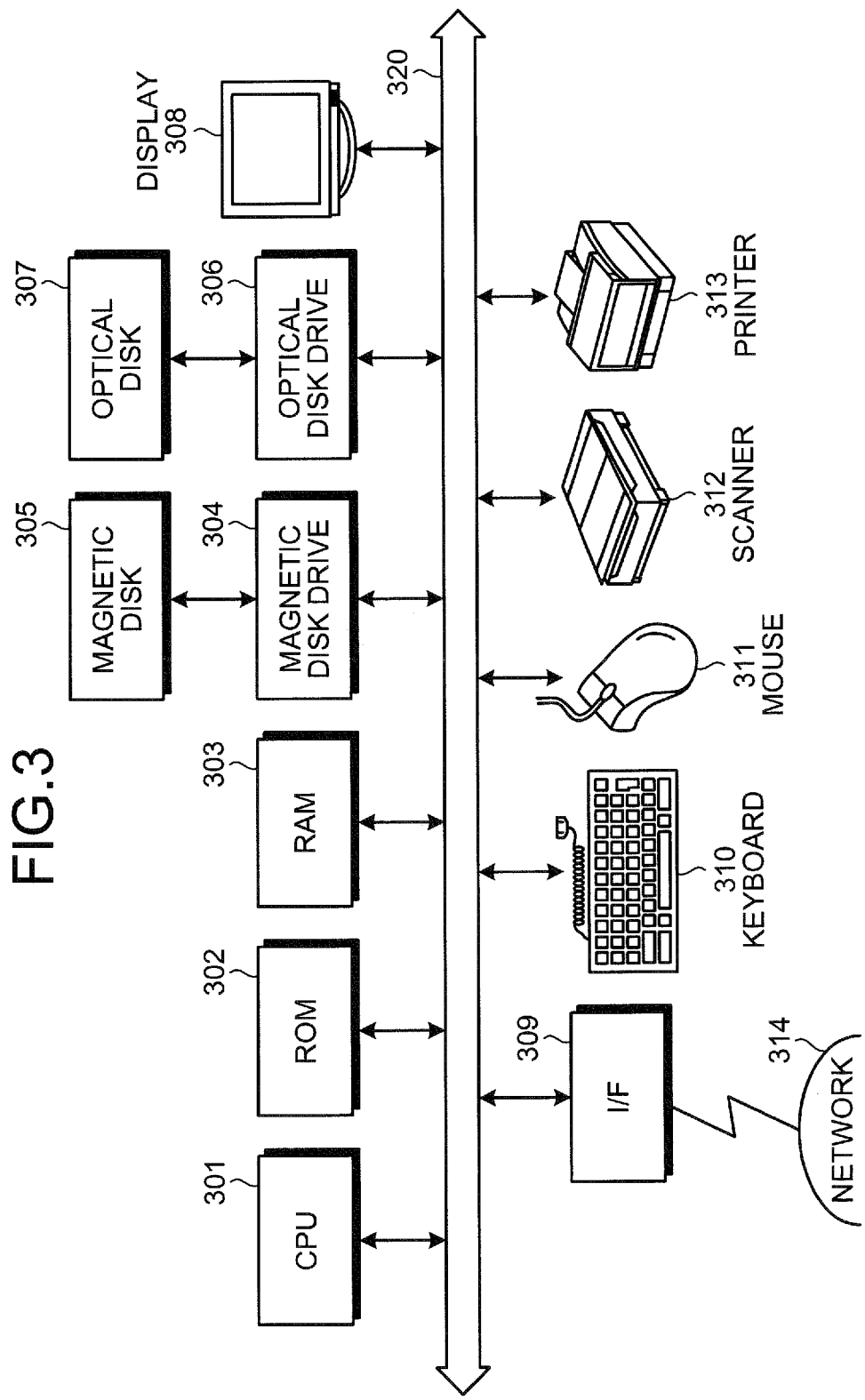
FIG. 3 is a block diagram of a hardware configuration of a transposing apparatus 100 according to the embodiment.

FIG. 3 is a block diagram of a hardware configuration of the transposing apparatus according to the embodiment. As depicted in FIG. 3, the transposing apparatus includes a central processing unit (CPU) 301, a read-only memory (ROM) 302, a random access memory (RAM) 303, a magnetic disk drive 304, a magnetic disk 305, an optical disk drive 306, an optical disk 307, a display 308, an interface (I/F) 309, a keyboard 310, a mouse 311, a scanner 312, and a printer 313, respectively connected by a bus 320.

The CPU 301 governs overall control of the transposing apparatus. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores data written under control of the optical disk drive 306, the data being read by a computer.

The display 308 displays, for example, data such as text, images, functional information, etc., in addition to a cursor, icons, and/or tool boxes. A liquid crystal display, a plasma display, etc., may be employed as the display 308.

The I/F 309 is connected to a network 314 such as a local area network (LAN), a wide area network (WAN), and the Internet through a communication line and is connected to other apparatuses through the network 314. The I/F 309 administers an internal interface with the network 314 and controls the input/output of data from/to external apparatuses. For example, a modem or a LAN adaptor may be employed as the I/F 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

The scanner 312 optically reads an image and takes in the image data into the transposing apparatus. The scanner 312 may have an optical character reader (OCR) function as well. The printer 313 prints image data and text data. The printer 313 may be, for example, a laser printer or an ink jet printer. Any one or more among the optical disk drive 306, the optical disk 307, the display 308, the keyboard 310, the mouse 311, the scanner 312, and the printer 313 may be omitted from the configuration.

An example of a functional configuration of the transposing apparatus 100 will be described, referring to FIG. 4.

FIG. 4 is a block diagram of an example of a functional configuration of the transposing apparatus 100. The transposing apparatus 100 includes a detecting unit 401, a transposing unit 402, and an output unit 403. Functions of the detecting unit 401, the transposing unit 402, and the output unit 403 are implemented by, for example, causing the CPU 301 to execute programs stored in the memory devices depicted in FIG. 3, such as the ROM 302, RAM 303, magnetic disk 305, and optical disk 307, or through the I/F 309.

The transposing apparatus 100 transposes data of the analysis space A so that the efficiency of the electromagnetic field analysis by computing elements PE included in the computing device C is improved. The transposing apparatus 100 may transpose data of the analysis space A so that the utilization efficiency of computing elements PE is improved based on the number of computing elements PE in the row direction and the number of computing elements in the column direction.

Functions of the transposing apparatus 100 in the case of transposing data of the analysis space A so that the efficiency of the electromagnetic field analysis by computing elements PE is improved will first be described. Functions of the transposing apparatus 100 in the case of transposing data of the analysis space A so that the efficiency of the electromagnetic field analysis by computing elements PE is improved are implemented by, for example, the detecting unit 401, the transposing unit 402, and the output unit 403. The process by the transposing apparatus 100 in the case of transposing data of the analysis space A so that the efficiency of the electromagnetic field analysis by computing elements is improved is, for example, the process that has been described referring FIGS. 1A and 1B.

For three-dimensional analysis subject data, the detecting unit 401 detects the number of lattices in the direction of the first axis of a three-dimensional coordinate system, the number of lattices in the direction of the second axis of the coordinate system, and the number of lattices in the direction of the third axis of the coordinate system. The three-dimensional analysis subject data is, for example, data indicative of an initial condition for an electromagnetic field in each unit space B included in the lattice-shaped analysis space A set in the three-dimensional coordinate system. The data indicative of the initial condition for the electromagnetic field is, for example, the initial value of the electromagnetic field in each of the unit spaces B. For example, when the directions V1 to V3 of the analysis space A are arranged to match the directions of the axes, respectively, the number of lattices in the direction of each axis represents, for example, the number of unit spaces B present continuously in each of the directions V1 to V3 in the analysis space A, that is, the number of lattices in respective axial directions described above.

In the example depicted in FIGS. 1A and 1B, in the analysis space A of FIG. 1B, the detecting unit 401 detects the numbers of lattices "10, 16, 4" in the directions V1 to V3 of the analysis space A arranged to match respective axial directions. This allows the transposing unit 402 to transpose the three-dimensional analysis subject data. Detected data is stored to, for example, the memory areas, such as the RAM 303, magnetic disk 305, and optical disk 307.

The transposing unit 402 transposes a group of lattices of the three-dimensional analysis subject data, based on each of the numbers of lattices detected by the detecting unit 401 and on the number of computing elements PE in the row direction and the number of computing elements PE in the column direction, among multiple computing elements PE. The multiple computing elements PE are arranged in, for example, a matrix formation, and are each connected to the memory device M. The computing elements PE are included in, for example, the computing device C that executes the electromagnetic field analysis of the analysis subject data. The transposing unit 402 transposes the group of lattices of the three-dimensional analysis subject data so that, for example, the direction of the lineup of the lattices of the three-dimensional analysis subject data is such that the number of the lattices that is the greatest, matches the direction of the axis that does not correspond to the row direction or the column direction, among the directions of the first, second, and third axes.

In the example of FIG. 1, the transposing unit 402 identifies the greatest number of lattices "16" among the numbers of lattices "10, 16, 4" in the directions V1 to V3 of the analysis space A and thus, identifies the direction V2 in which the number of lattices is the greatest. The transposing unit 402 then exchanges variables for the electromagnetic field along the direction V2, for variables for the electromagnetic field along the direction V1 so that the identified direction V2 becomes the X-axis direction in which the efficiency of the electromagnetic analysis is improved, thereby transposes the data of the analysis space A. Hence, the transposing unit 402 transposes the data of the analysis space A in which the numbers of lattices in respective axial directions of the three-dimensional coordinate system are "10, 16, 4" into data of the analysis space A in which the numbers of lattices in respective axial directions of the three-dimensional coordinate system are "16, 10, 4".

In this manner, the transposing unit 402 can generate analysis subject data that improves the efficiency of the electromagnetic field analysis by the computing elements PE. The transposed data is stored to a memory device, such as the RAM 303, magnetic disk 305, and optical disk 307.

The output unit 403 outputs the three-dimensional analysis subject data transposed by the transposing unit 402, to the computing device C. The output unit 403, for example, divides the post-transposition analysis space A into spaces corresponding to the arrangement positions of a matrix of computing elements PE. The output unit 403 then outputs the spaces corresponding to the arrangement positions, to computing elements PE present at the arrangement positions. Through this process, the output unit 403 causes the computing elements PE to execute the electromagnetic field analysis of the spaces.

Forms of data output includes display on the display 308, printout by the printer 313, and transmission to an external apparatus through the I/F 309. The data may be stored in memory areas, such as the RAM 303, magnetic disk 305, and optical disk 307.

The function of the transposing apparatus 100 in the case of transposing data of the analysis space A so that the utilization efficiency of computing elements PE is improved based on the number of computing elements PE in the row direction and the number of computing elements in the column direction will be described. Functions of the transposing apparatus 100 in the case of transposing data of the analysis space A so that the utilization efficiency of computing elements PE is improved are implemented by, for example, the detecting unit 401, the transposing unit 402, and the output unit 403.

Functions of the detecting unit 401 and the output unit 403 are the same as the functions of the detecting unit 401 and the output unit 403 in the above case of transposing data of the analysis space A so that the efficiency of the electromagnetic field analysis by the computing elements PE is improved, and are therefore omitted in further description. An example of the process by the transposing apparatus 100 in the case of transposing data of the analysis space A so that the utilization efficiency of the computing elements PE is improved will be described later, referring to FIG. 5 or FIGS. 14 and 15.

The transposing unit 402 determines whether the least number of lined-up lattices among numbers of lined-up lattices in respective directions is larger than the number of lined-up computing elements PE in the row direction and the number of lined-up computing elements PE in the column direction. If determining that the least number of lined-up lattices is larger than the number of lined-up computing elements PE in the row direction and the number of lined-up computing elements PE in the column direction, the transposing unit 402 transposes the group of lattices of the three-dimensional analysis subject data so that the direction of the lineup of lattices of the three-dimensional analysis subject data is such that the number of the lineup of lattices that is the greatest, matches the direction of the axis that does not correspond to the row direction or the column direction, among the directions of the first, second, and third axes.

The transposing unit 402 then identifies the direction of the axis corresponding to the lineup direction in which the number of lined-up computing elements PE is the least among the number of lined-up computing elements PE in the row direction and the number of lined-up computing elements PE in the column direction, among the directions of the first, second, and third axes. The transposing unit 402 then transposes the group of lattices of the three-dimensional analysis subject data so that the direction of lined-up lattices of the three-dimensional analysis subject data, the number of the lined-up lattices being the least, becomes the identified direction of the axis.

A case is described where in the three-dimensional coordinate system, the number of lattices in respective axial directions are "8, 6, 10", the number of lined-up computing elements PE in the row direction is "4", and the number of lined-up computing elements PE in the column direction is "3". It is assumed in this case that the row direction and the column direction of a matrix of computing elements PE correspond to the Y-axis direction and the Z-axis direction, respectively. In this case, for example, the transposing unit 402 identifies the greatest number of lattices "10" and the least number of lattices "6" among the numbers of lattices in respective directions of the analysis space A. The transposing unit 402 then transposes data of the analysis space A so that among the directions V1 to V3, the direction in which the number of lattices is the greatest number of lattices "10" becomes the X-axis direction and the direction in which the number of lattices is the least number of lattices "6" becomes the Z-axis direction. Hence, the transposing unit 402 transposes the data of the analysis space A in which the numbers of lattices in respective axial directions are "8, 6, 10" into data of the analysis space A in which the numbers of lattices in respective axial directions are "10, 8, 6".

In this manner, the transposing unit 402 can generate analysis subject data that improves the efficiency of the electromagnetic field analysis by the computing elements PE and that improves the utilization efficiency of the computing elements PE. The transposed data is stored in the memory devices, such as the RAM 303, magnetic disk 305, and optical disk 307.

The transposing unit 402 determines whether the greatest number of lined-up lattices among lined-up lattices in the respective directions is smaller than the number of lined-up computing elements PE in the row direction and the number of lined-up computing elements PE in the column direction. When determining that the greatest number of lined-up lattices is smaller than the number of lined-up computing elements PE in the row direction and the number of lined-up computing elements PE in the column direction, the transposing unit 402 identifies the direction of the axis corresponding to the lineup direction in which the number of lined-up computing elements PE is the greatest among the number of lined-up computing elements PE in the row direction and the number of lined-up computing elements PE in the column direction, among the directions of the first, second, and third axes. The transposing unit 402 then transposes the group of lattices of the three-dimensional analysis subject data so that the direction of the lineup of lattices of the three-dimensional analysis subject data is such that the number of the lined-up lattices that is the greatest, becomes the identified direction of the axis.

The transposing unit 402 then transposes the group of lattices of the three-dimensional analysis subject data so that the direction of lined-up lattices of the three-dimensional analysis subject data is such that the number of the lined-up lattices that is the least, becomes the direction of the axis not corresponding to the row direction or the column direction, among the directions of the first, second, and third axes.

A case is described where in the three-dimensional coordinate system, the number of lattices in respective axial directions are "3, 2, 2", the number of lined-up computing elements PE in the row direction is "4", and the number of lined-up computing elements PE in the column direction is "3". It is assumed in this case that the row direction and the column direction of a matrix of computing elements PE correspond to the Y-axis direction and the Z-axis direction, respectively. In this case, for example, the transposing unit 402 identifies the greatest number of lattices "3" and the least number of lattices "2" among the numbers of lattices in respective directions of the analysis space A. The transposing unit 402 then transposes data of the analysis space A so that among the directions V1 to V3, the direction in which the number of lattices is the greatest number of lattices "3" becomes the Y-axis direction and that the direction in which the number of lattices is the least number of lattices "2" becomes the X-axis direction. Hence, the transposing unit 402 transposes the data of the analysis space A in which the numbers of lattices in respective axial directions are "3, 2, 2" into data of the analysis space A in which the numbers of lattices in respective axial directions are "2, 3, 2".

In this manner, the transposing unit 402 can generate analysis subject data that improves the efficiency of the electromagnetic field analysis by the computing elements PE and that improves the utilization efficiency of the computing elements PE. The transposed data is stored in the memory devices, such as the RAM 303, magnetic disk 305, and optical disk 307.

The transposing unit 402 determines whether the first number of lined-up computing elements PE selected as the larger number of computing elements PE among the number of lined-up computing elements PE in the row direction and the number of lined-up computing elements PE in the column direction is larger than the least number of lined-up lattices among respective numbers of lined-up lattices. The transposing unit 402 also determines whether the second number of lined-up computing elements PE selected as the smaller number of computing elements PE among the number of lined-up computing elements PE in the row direction and the number of lined-up computing elements PE in the column direction is smaller than the greatest number of lined-up lattices among respective numbers of lined-up lattices. If determining that the first number of lined-up computing elements PE is larger than the least number of lined-up lattices and the second number of lined-up computing elements PE is smaller than the greatest number of lined-up lattices, the transposing unit 402 executes the following process.

The transposing unit 402 identifies the direction of the axis corresponding to the direction of lineup of the first number of lined-up computing elements PE, among the directions of the first, second, and third axes. The transposing unit 402 then transposes the group of lattices of the three-dimensional analysis subject data so that the direction of a lineup of lattices of the three-dimensional analysis subject data, the number of the lineup of lattices being close to the first number of lined-up computing elements PE among the middle number of line-up lattices equal to or less than the greatest number of lined-up lattices and equal to or larger than the least number of lined-up lattices and the greatest number of lined-up lattices, matches the identified direction of the axis. The transposing unit 402 then identifies the direction of the axis corresponding to the direction of lineup of the second number of lined-up computing elements PE, among the directions of the first, second, and third axes. The transposing unit 402 then transposes the group of lattices of the three-dimensional analysis subject data so that the direction of lined-up lattices of the three-dimensional analysis subject data, the number of the lined-up lattices being close to the second number of lined-up computing elements PE among the middle number of line-up lattices and the least number of lined-up lattices, matches the identified direction of the axis.

A case is described where in the three-dimensional coordinate system, the number of lattices in respective axial directions are "6, 8, 2", the number of lined-up computing elements PE in the row direction is "4", and the number of lined-up computing elements PE in the column direction is "3". It is assumed in this case that the row direction and the column direction of a matrix of computing elements PE correspond to the Y-axis direction and the Z-axis direction, respectively. In this case, for example, the transposing unit 402 identifies the greatest number of lattices "8", the middle number of lattices "6", and the least number of lattices "2" among the numbers of lattices in respective directions of the analysis space A. The transposing unit 402 then transposes data of the analysis space A so that a direction in which the number of lattices is "6", which is close to the number of lined-up computing elements PE "4" in the row direction, among the greatest number of lattices "8" and the middle number of lattices "6" becomes the Y-axis direction.

The transposing unit 402 then transposes data of the analysis space A so that a direction which is not transposed into the Y-axis direction and in which the number of lattices is "2", which is close to the number of lined-up computing elements PE "3" in the column direction, among the middle number of lattices "6" and the least number of lattices "2" becomes the Z-axis direction. Hence, the transposing unit 402 transposes the data of the analysis space A in which the numbers of lattices in respective axial directions are "6, 8, 2" into data of the analysis space A in which the numbers of lattices in respective axial directions are "8, 6, 2".

In this manner, the transposing unit 402 can generate analysis subject data that improves the efficiency of the electromagnetic field analysis by the computing elements PE and that improves the utilization efficiency of the computing elements PE. The transposed data is stored in the memory devices, such as the RAM 303, magnetic disk 305, and optical disk 307.

A working example 1 of transposition of data of the analysis space A by the transposing apparatus 100 will be described, referring to FIG. 5. The working example 1 is an example in which the unit spaces B of the analysis space A are transposed so that the utilization efficiency of the computing elements PE is improved.

FIG. 5 is an explanatory diagram of the working example 1 of transposition of data of the analysis space A by the transposing apparatus 100. In FIG. 5, the numbers of lattices in respective directions V1 to V3 of the analysis space A are "8, 10, 6", and the direction V1, direction V2, and direction V3 match the x-axis direction, Y-axis direction, and Z-axis direction, respectively. The numbers of lattices in respective axial directions are, therefore, "8, 10, 6". Multiple computing elements PE are arranged into a "4-line/3-column" two-dimensional matrix formation. It is assumed the row direction and the column direction of the matrix of computing elements PE correspond to the Y-axis direction and the Z-axis direction, respectively.

The transposing apparatus 100 transposes data of the analysis space A so that a direction in which the size of the analysis space A is the greatest becomes the X-axis direction in which the efficiency of the electromagnetic field analysis is improved. The transposing apparatus 100 then transposes the data of the analysis space A so that a direction in which the size of the analysis space A is the least becomes the axial direction corresponding to a direction in which the number of lined-up computing elements PE is larger among the row direction and the column direction of the multiple computing elements PE. The transposing apparatus 100 then divides the post-transposition analysis space A by lattices configured by cells corresponding to the arrangement positions of the computing elements PE, and causes each computing element PE to execute the electromagnetic field analysis of a space present in the cell.

The transposing apparatus 100 identifies, for example, the greatest number of lattices "10" among the numbers of lattices "8, 10, 6" in respective directions V1 to V3 of the analysis space A and thereby, identifies the direction V2 in which the number of lattices is the greatest. The transposing apparatus 100 then exchanges variables for the electromagnetic field along the direction V2, for variables for the electromagnetic field along the direction V1 matching the X-axis direction so that the identified direction V2 becomes the X-axis direction in which the efficiency of the electromagnetic field analysis is improved and thereby, transposes data of the analysis space A.

The transposing apparatus 100 identifies the least number of lattices "6" among the numbers of lattices "10, 8, 6" in respective directions V1 to V3 of the post-transposition analysis space A, thus identifying the direction V3 in which the number of lattices is the least. The transposing apparatus 100 transposes data of the analysis space A so that the identified direction V3 becomes the Z-axis direction corresponding to a direction in which the number of lined-up computing elements PE is smaller among the row direction and the column direction of the multiple computing elements PE. In FIG. 5, the direction V3 matches the Z-axis direction, so that the data of the analysis space A is not transposed in the direction V3. As a result, transposing apparatus 100 transposes the data of the analysis space A in which the numbers of lattices in respective axial directions of the three-dimensional coordinate system are "8, 10, 6" into data of the analysis space A in which the numbers of lattices in respective axial directions of the three-dimensional coordinate system are "10, 8, 6".

The transposing apparatus 100 then divides the post-transposition analysis space A by lattices having cells corresponding to the arrangement positions of the computing elements PE into spaces in the divided cells. The transposing apparatus 100 assigns a space in each cell corresponding to the arrangement position of each computing element PE, to each computing element PE and causes the computing element PE to execute the electromagnetic field analysis of the assigned space.

For example, the transposing apparatus 100 divides the analysis space A in which the numbers of lattices in respective axial directions are "10, 8, 6" into 12 spaces with the numbers of lattices of "10, 2, 2" so that the divided spaces correspond to the arrangement position of a "4-line/3-column" matrix of the computing elements PE. The transposing apparatus 100 then assigns a space corresponding to the arrangement position of each computing element PE, to each computing element PE and causes the computing element PE to execute the electromagnetic field analysis of the assigned space.

Through this process, the transposing apparatus 100 increases a processing volume for the electromagnetic field analysis on the X-axis direction in which the computing elements PE performs efficient calculation, and reduces a processing volume for the electromagnetic field analysis along the directions of the Y-axis and the Z-axis. As a result, the computing elements PE can reduce the time consumed for the analysis of the post-transposition analysis space A to a period shorter than the time consumed for the electromagnetic field analysis of the pre-transposition analysis space A.

The transposing apparatus 100 assigns 48 unit spaces B at maximum to each computing element PE before the transposition, and assigns 40 unit spaces B at maximum after the transposition. As a result, the transposing apparatus 100 averages processing volumes of the computing elements PE and thereby, improves the utilization efficiency of each computing element PE.

Order of assignment of surplus unit spaces B will be described, referring to FIG. 6. Surplus unit spaces B are unit spaces B that are remain as surplus when the analysis space A is divided into unit spaces B corresponding to the arrangement positions of multiple computing elements PE, the analysis space A cannot be divided into each of the same number of unit spaces B corresponding to each computing element PE.

FIG. 6 is an explanatory diagram of the order of assignment of surplus unit spaces B. In FIG. 6, multiple computing elements PE are arranged into a "4-line/3-column" two-dimensional matrix formation. According to the pre-transposition analysis space A of FIG. 5, the transposing apparatus 100 cannot divide the analysis space A into each of the same number of unit spaces B corresponding to each computing element PE because the number of lined-up lattices in the Y-axis direction is "10" as the number of lined-up computing elements PE in the row direction is "4".

In such a case, the transposing apparatus 100 divides the analysis space A so that a greater number of unit spaces B are assigned to computing elements PE arranged in the inner area of the matrix of computing elements PE. The transposing apparatus 100, for example, divides the analysis space A so that 40 unit spaces B are assigned to computing elements PE arranged in the inner area of the matrix among the entire computing elements PE while 32 unit spaces B are assigned to computing elements PE arranged in the outer area of the matrix.

Through this process, the transposing apparatus 100 reduces a processing volume of the computing elements PE arranged in the outer area of the matrix, where calculation of an absorbing boundary condition in the electromagnetic field analysis is executed, to a processing volume smaller than a processing volume of the computing elements PE arranged in the inner area of the matrix, where calculation of an absorbing boundary condition in the electromagnetic field analysis is not executed. As a result, a processing volume of the computing elements PE, together with a processing volume of calculation of the absorbing boundary condition, can be averaged.

The electromagnetic field analysis that the transposing apparatus 100 causes the computing element PE to execute will be described, referring to FIGS. 7 to 9. The transposing apparatus 100 causes the computing element PE to solve calculation equations by the FDTD method given as equations (1) to (6), thereby causes the computing element PE to calculate the value of an electromagnetic field in each unit space B included in assigned spaces.

In equations (1) to (6), Ex denotes the value of an electric field in the X-axis direction, Ey denotes the value of the electric field in the Y-axis direction, Ez denotes the value of the electric field in the Z-axis direction, Hx denotes the value of a magnetic field in the X-axis direction, Hy denotes the value of the magnetic field in the Y-axis direction, Hz denotes the value of the magnetic field in the Z-axis direction, t denotes time, i, j, and k denote a coordinate value on the X-axis, a coordinate value on the Y-axis, and a coordinate value on the Z-axis, respectively, and α and β each denote a constant.

$$Ex(x, y, z, t) = \alpha x \times Ex(x, y, z, t-1) + \quad (1)$$
$$\beta x \times \begin{bmatrix} \{Hz(x, y, z, t-\frac{1}{2}) - Hz(x, y-1, z, t-\frac{1}{2})\} - \\ \{Hy(x, y, z, t-\frac{1}{2}) - Hy(x, y, z-1, t-\frac{1}{2})\} \end{bmatrix}$$

$$Ey(x, y, z, t) = \alpha y \times Ey(x, y, z, t-1) + \quad (2)$$
$$\beta y \times \begin{bmatrix} \{Hz(x, y, z, t-\frac{1}{2}) - Hz(x-1, y, z, t-\frac{1}{2})\} - \\ \{Hx(x, y, z, t-\frac{1}{2}) - Hx(x, y, z-1, t-\frac{1}{2})\} \end{bmatrix}$$

$$Ez(x, y, z, t) = \alpha z \times Ez(x, y, z, t-1) + \quad (3)$$
$$\beta z \times \begin{bmatrix} \{Hy(x, y, z, t-\frac{1}{2}) - Hy(x-1, y, z, t-\frac{1}{2})\} - \\ \{Hx(x, y, z, t-\frac{1}{2}) - Hx(x, y-1, z, t-\frac{1}{2})\} \end{bmatrix}$$

$$Hx(x, y, z, t) = \alpha x \times Hx(x, y, z, t-1) + \quad (4)$$
$$\beta x \times \begin{bmatrix} \{Ez(x, y, z, t-\frac{1}{2}) - Ez(x, y-1, z, t-\frac{1}{2})\} - \\ \{Ey(x, y, z, t-\frac{1}{2}) - Ey(x, y, z-1, t-\frac{1}{2})\} \end{bmatrix}$$

$$Hy(x, y, z, t) = \alpha y \times Hy(x, y, z, t-1) + \quad (5)$$
$$\beta y \times \begin{bmatrix} \{Ez(x, y, z, t-\frac{1}{2}) - Ez(x-1, y, z, t-\frac{1}{2})\} - \\ \{Ex(x, y, z, t-\frac{1}{2}) - Ex(x, y, z-1, t-\frac{1}{2})\} \end{bmatrix}$$

$$Hz(x, y, z, t) = \alpha z \times Hz(x, y, z, t-1) + \quad (6)$$
$$\beta z \times \begin{bmatrix} \{Ey(x, y, z, t-\frac{1}{2}) - Ey(x-1, y, z, t-\frac{1}{2})\} - \\ \{Ex(x, y, z, t-\frac{1}{2}) - Ex(x, y-1, z, t-\frac{1}{2})\} \end{bmatrix}$$

For example, the transposing apparatus 100 transmits an execution command string depicted in FIG. 7 to the computing element PE to cause the computing element PE to execute the electromagnetic field analysis of a space assigned to the computing element PE. The execution command string will be described, referring to FIG. 7.

FIG. 7 is an explanatory diagram of one example of the execution command string. As depicted in FIG. 7, the transposing apparatus 100 first generates an execution command string for calculating Ex. The execution command string for calculating Ex includes, for example, a read command for reading constants αx and βx to be substituted into equation (1) and values of the electromagnetic fields Ex, Hz, and Hy (which read command is expressed as "SDRAM READ [ ]" in FIG. 7.)

The execution command string for calculating Ex also includes, for example, a computing command for substituting a read value into equation (1) and calculating the value of the electric field Ex (which computing command is expressed in FIG. 7 as "CARC"). The execution command string for calculating Ex also includes, for example, a write command for writing the calculated value of the electric field Ex to the memory device M (which writ command is expressed as "SDRAM WRITE [ ]" in FIG. 7.)

Hence, following a read command, the computing element PE reads the initial values of the electric field EX, Ey, and Ez at time "t=1" and the initial values of the magnetic field Hx, Hy, and Hz at time "t=½", from the memory device M. Following a computing command, the computing element PE then substitutes the read values of the electromagnetic field Ex, Ey, Ez, Hx, Hy, and Hz into equations (1) to (3). The computing element PE calculates the values of the electric filed Ex, Ey, and Ez at time "t=1".

Following a read command, the computing element PE reads the values of the electric field EX, Ey, and Ez at time "t=1" and the initial values of the magnetic field Hx, Hy, and Hz at time "t=½", from the memory device M. Following a computing command, the computing element PE substitutes the read values of the electromagnetic field Ex, Ey, Ez, Hx, Hy, and Hz into equations (4) to (6) to calculate the values of the magnetic field Hx, Hy, and Hz at time "t=1+½". In this manner, the computing element PE repeats the above calculations according to the execution command string to alternately calculate values of the electric field and values of the magnetic field and thereby, calculates values of the electromagnetic field at specified times.

A specified time is a time of ending the electromagnetic field analysis, which is, for example, input by the user into the user terminal 201, is transmitted from the user terminal 201 to the transposing apparatus 100, and is transmitted from the transposing apparatus 100 to the computing element PE.

The computing element PE calculates the value of the electromagnetic field at the present time by substituting the value of the electromagnetic field in an adjacent unit space B at the previous time into equations (1) to (6). For this reason, the computing element PE may exchange the value of the electromagnetic field at the previous time with an adjacent computing element PE.

The execution command string for calculating Ex includes, for example, a transmission command for transmitting the calculated value of the electric field Ex to an adjacent computing element PE (which transmission command is expressed in FIG. 7 as "FPGA data transfer (transmission)"). The execution command string for calculating Ex also includes, for example, a reception command for receiving the value of the electric field Ex calculated by an adjacent computing element PE (which reception command is expressed in FIG. 7 as "FPGA data transfer (reception)"). A case of computing elements PE adjacent to each other exchanging the value of the electromagnetic field according to an execution command string will be described, referring to FIG. 8.

Figure 8:
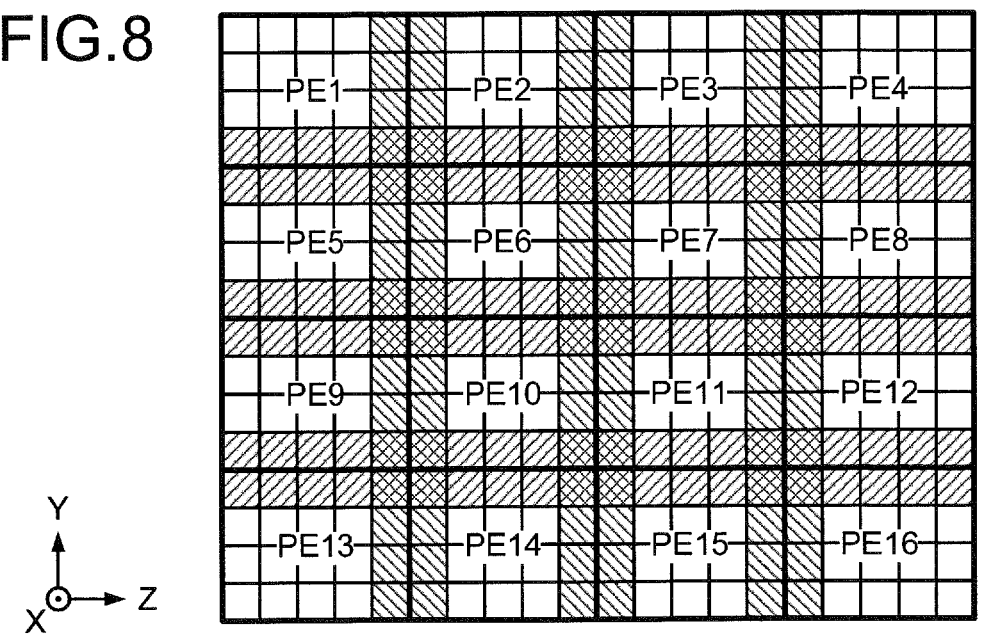
FIG. 8 is an explanatory diagram of data exchange between computing elements PE.

FIG. 8 is an explanatory diagram of data exchange between computing elements PE. As depicted in FIG. 8, computing elements PE1 to PE16 each execute the electromagnetic field analysis of each unit space B. The computing elements PE perform data exchange concerning the electromagnetic field in unit spaces B present in the boundary between computing elements PE.

For example, the computing element PE1 and the computing element PE2 exchange the values of electromagnetic field Ez and Hz on the Z-axis direction of adjacent unit space B with each other. This allows the computing element PE to acquire a computation result by an adjacent computing element PE and execute the electromagnetic field analysis.

When the electromagnetic field analysis by each computing element PE is completed, the transposing apparatus 100 acquires the result of electromagnetic field analysis from each computing element PE, and outputs the result of electromagnetic field analysis of the analysis space A as a whole. For this process, the execution command string of FIG. 7 includes, for example, a transmission command for transmitting the calculated value of the electromagnetic field to the transposing apparatus 100 (which transmission command in FIG. 7 is expressed as "computation result output"). Output of the result of electromagnetic field analysis of the analysis space A as a whole will be described, referring to FIG. 9.

Figure 9:
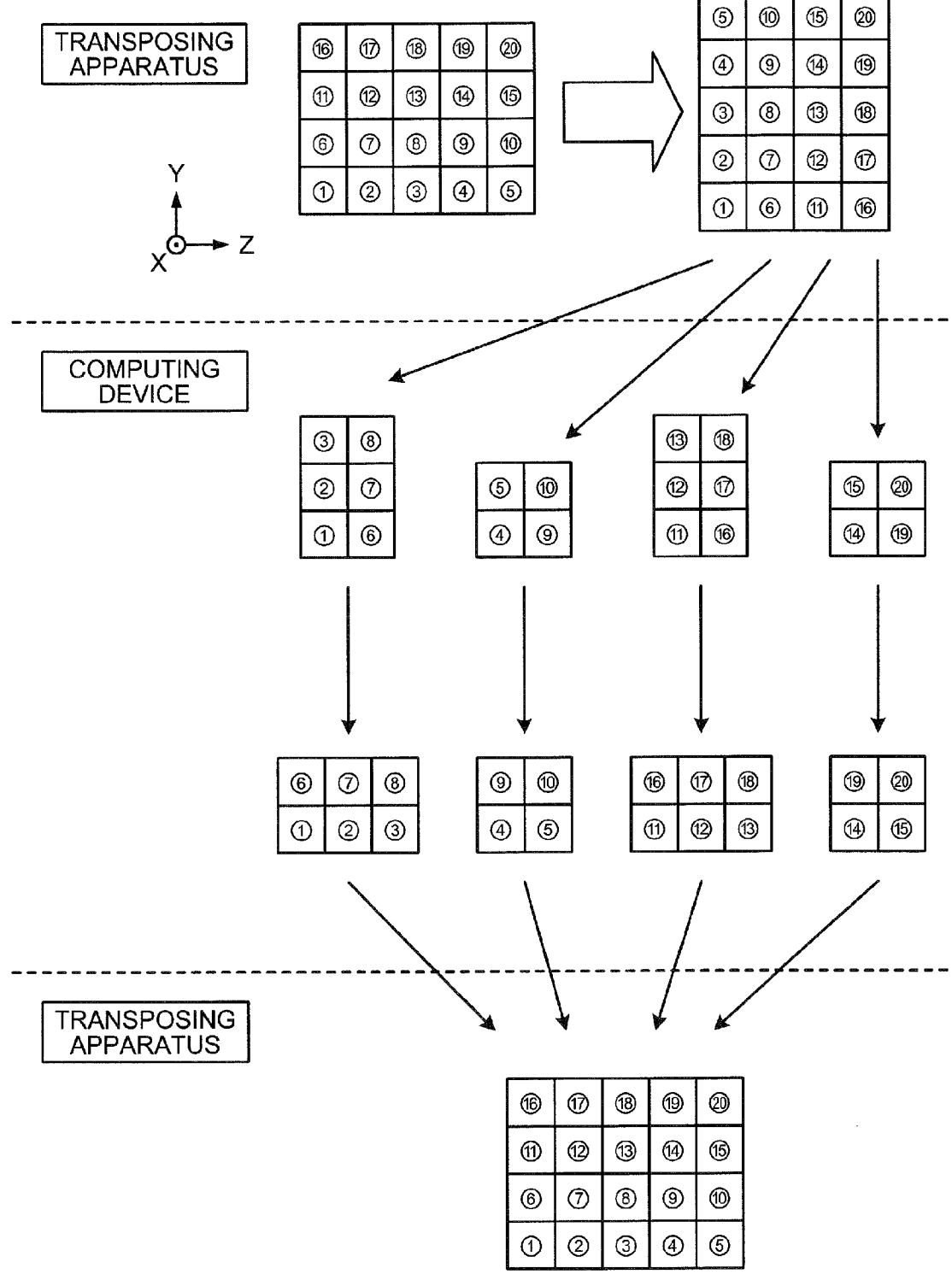
FIG. 9 is an explanatory diagram of output of the result of electromagnetic field analysis of the analysis space A as a whole.

FIG. 9 is an explanatory diagram of output of the result of electromagnetic field analysis of the analysis space A as a whole. As depicted in FIG. 9, the transposing apparatus 100 divides the analysis space A given by exchanging values of the electromagnetic field in the Y-axis direction and values of the electromagnetic field in the Z-axis direction for each other and assigns divided spaces to four computing elements PE.

The computing element PE calculates the value of the electromagnetic field in the unit space B assigned to the computing element PE by an execution command string, and transmits the calculated value of the electromagnetic field to the transposing apparatus 100 according to a transmission command. At this time, the computing element PE may exchange values of the electromagnetic field in the Y-axis direction and values of the electromagnetic field in the Z-axis, which have been exchanged by the transposing apparatus 100, again to return the values to the original state.

Receiving values of the electromagnetic field from the computing elements PE, the transposing apparatus 100 merges the received values of the electromagnetic field together to generate the value of the electromagnetic field in the analysis space A as a whole. The transposing apparatus 100 then outputs the generated value of the electromagnetic field. Hence, the user of the transposing apparatus 100 acquires the value of the electromagnetic field in the analysis space A.

A procedure of the electromagnetic field analysis process according to the working example 1 will be described in detail, referring to FIGS. 10 to 12.

Figure 10:
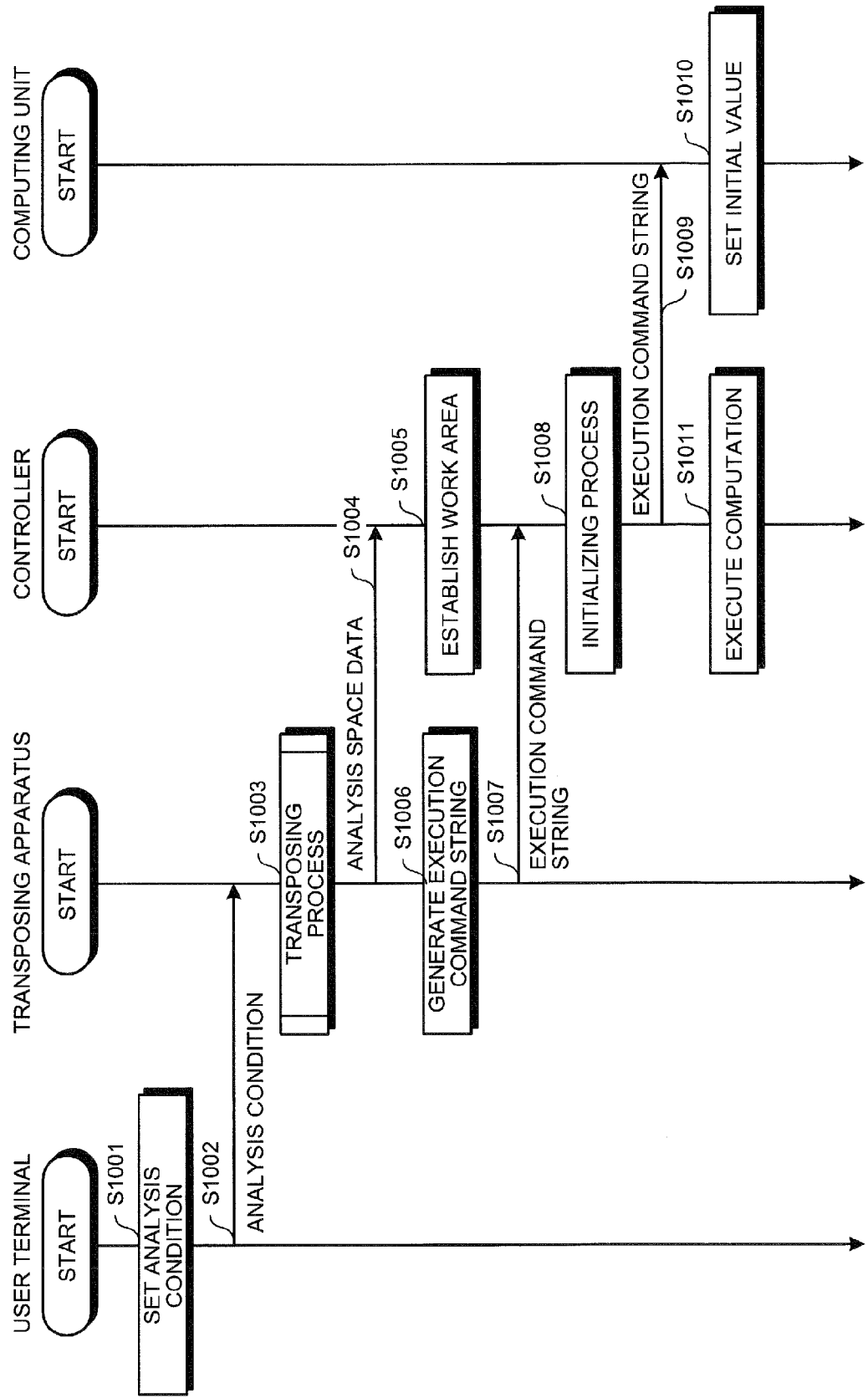
FIGS. 10, 11, and 12 are sequence diagrams of a procedure of the electromagnetic field analysis process of the working example 1.
Figure 11:
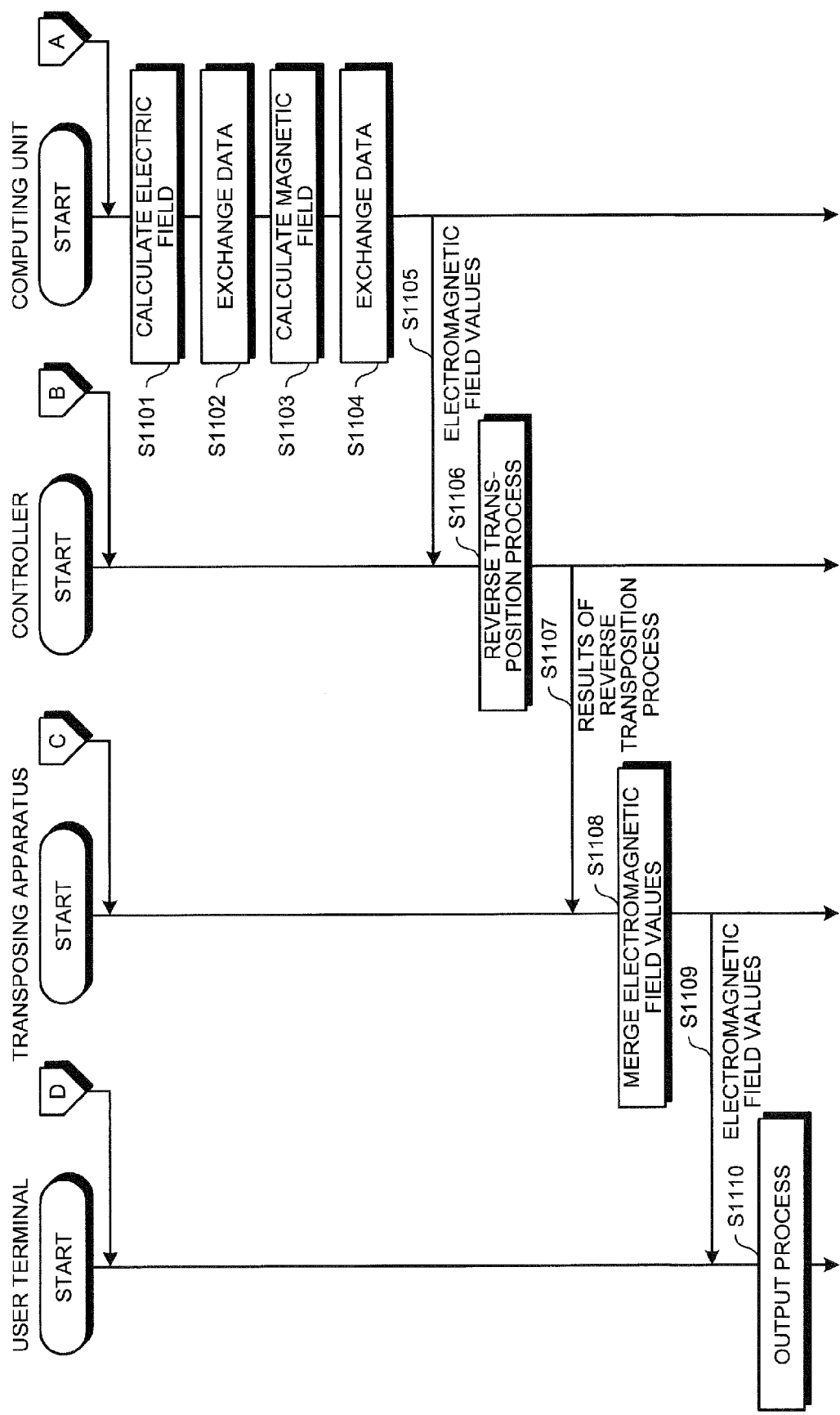
Figure 12:
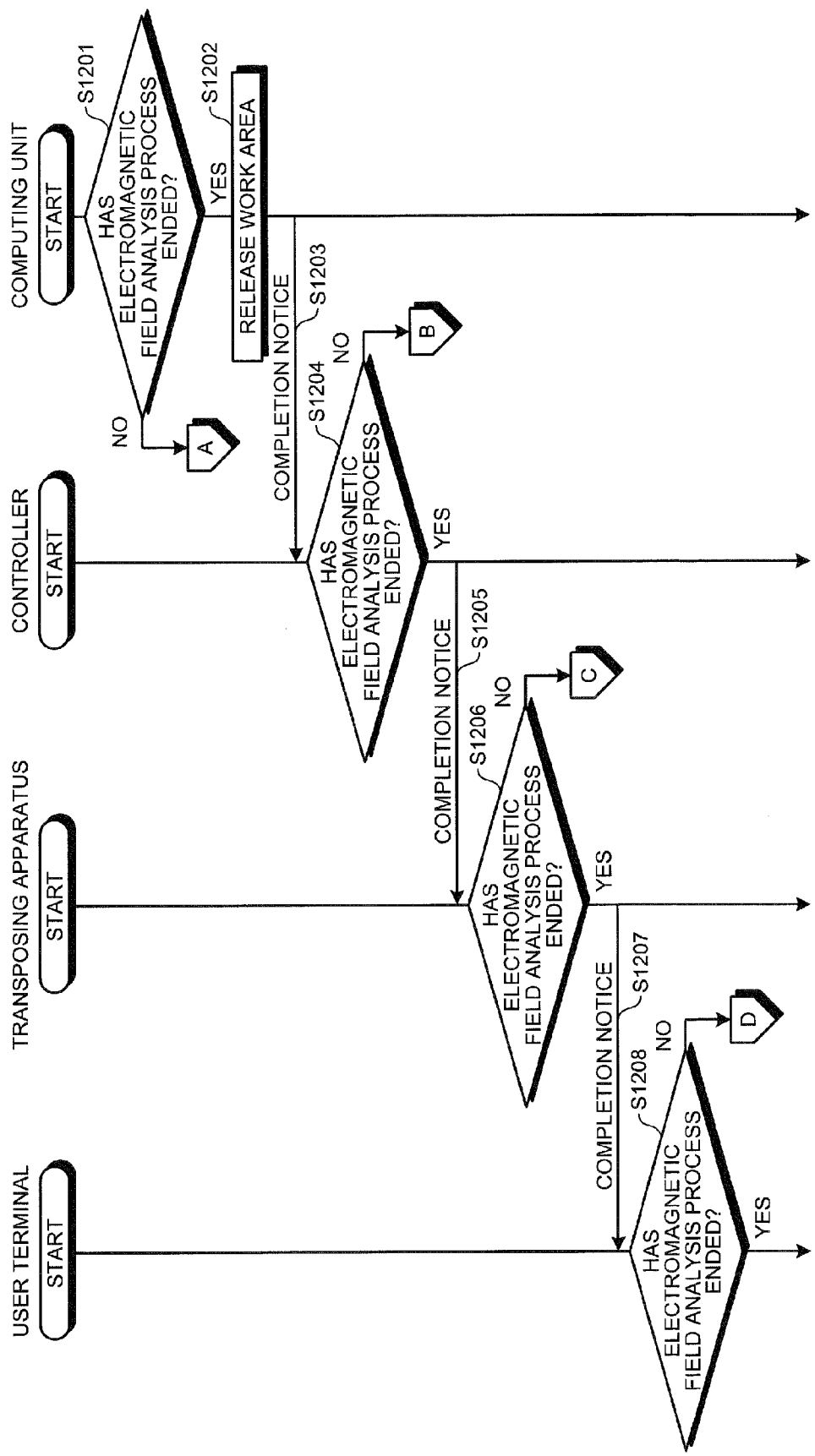

FIGS. 10, 11, and 12 are sequence diagrams of a procedure of the electromagnetic field analysis process of the working example 1. As depicted in FIG. 10, the user terminal 201 receives input of an analysis condition (step S1001). The user terminal 201 then transmits the received analysis condition to the transposing apparatus 100 (step S1002).

Figure 13:
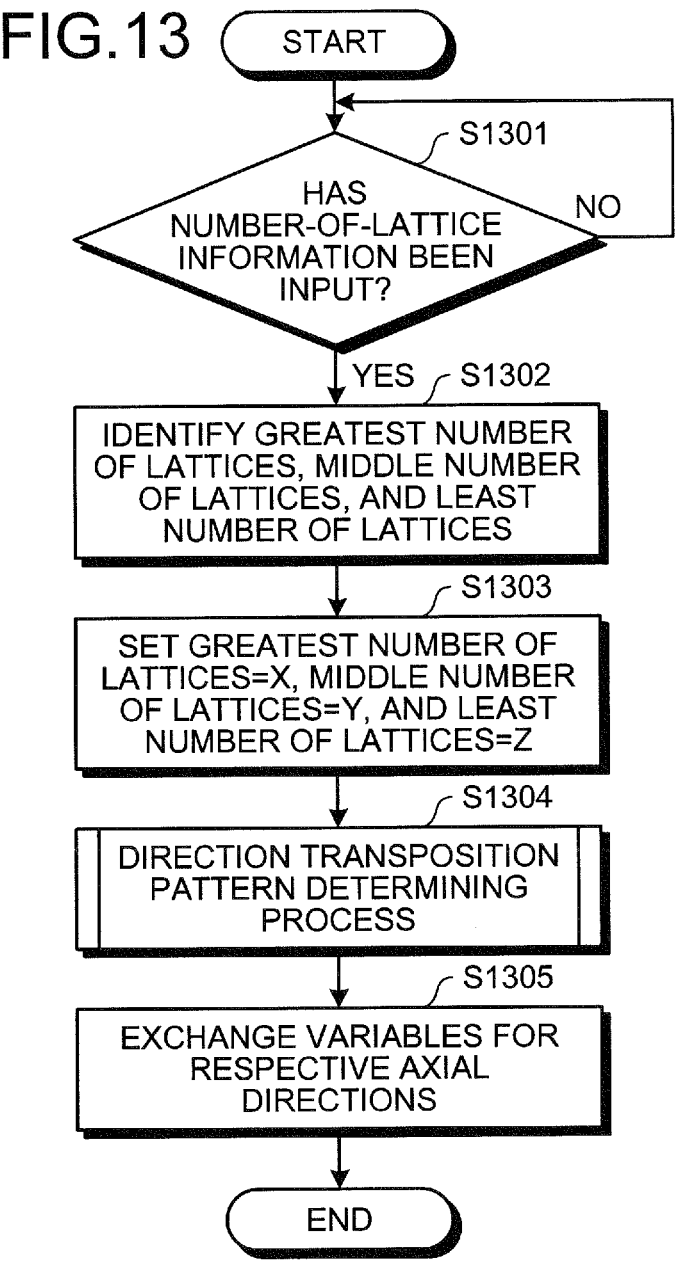
FIG. 13 is a flowchart of a procedure of a transposing process by the transposing apparatus 100 of the working example 1.

Receiving the analysis condition from the user terminal 201, the transposing apparatus 100 executes a transposing process depicted in FIG. 13 or FIG. 17 (step S1003). The transposing apparatus 100 transmits the post-transposition analysis space A resulting from the transposing process, to the controller 202 of the computing device C (step S1004). Receiving the analysis space A, the controller 202 establishes a work area to be used for an electromagnetic field analysis of the analysis space A (step S1005).

Subsequently, the transposing apparatus 100 generates an execution command string for the electromagnetic field analysis (step S1006). The transposing apparatus 100 transmits the generated execution command string to the controller 202 of the computing device C (step S1007).

Subsequently, the controller 202 executes an initializing process (step S1008). The controller 202 assigns the received execution command string to each computing unit 203 (step S1009). The computing unit 203 sets an initial value (step S1010). The controller 202 executes computation (step S1011) and thereafter, steps of FIG. 11 follow.

As depicted in FIG. 11, the computing unit 203 calculates values of an electric field in the analysis space A (step S1101). The computing unit 203 exchanges calculated values of the electric field between computing elements PE (step S1102).

The computing unit 203 calculates values of a magnetic field in the analysis space A (step S1103). The computing unit 203 exchanges calculated values of the magnetic field between computing elements PE (step S1104). The computing unit 203 transmits calculated values of the electromagnetic field to the controller 202 (step S1105).

Receiving the values of the electromagnetic field, the controller 202 executes a reverse transposition process on the received values of the electromagnetic field (step S1106). The controller 202 transmits the values of the electromagnetic field subjected to the reverse transposition process, to the transposing apparatus 100 (step S1107).

Receiving the values of the electromagnetic field from the controller 202, the transposing apparatus 100 merges the received values of the electromagnetic field together to generate the value of the electromagnetic field in the analysis space A as a whole (step S1108). The transposing apparatus 100 transmits the generated value of the electromagnetic field in the analysis space A to the user terminal 201 (step S1109). The user terminal 201 outputs the received value of the electromagnetic field in the analysis space A (step S1110) and thereafter, steps of FIG. 12 follow.

As depicted in FIG. 12, the computing unit 203 determines whether the electromagnetic field analysis process has ended (step S1201). If the electromagnetic field analysis process has not ended (step S1201: NO), the computing unit 203 returns to step S1101 of FIG. 11.

If the electromagnetic field analysis process has ended (step S1201: YES), the computing unit 203 releases the work area (step S1202). The computing unit 203 transmits a notice of the end of the electromagnetic field analysis process to the controller 202 (step S1203), and ends the electromagnetic field analysis process.

The controller 202 determines whether the electromagnetic field analysis process has ended (step S1204). If the electromagnetic field analysis process has not ended (step S1204: NO), the controller 202 returns to step S1106 of FIG. 11.

If the electromagnetic field analysis process has ended (step S1204: YES), the controller 202 transmits a notice of the end of the electromagnetic field analysis process to the transposing apparatus 100 (step S1205), and ends the electromagnetic field analysis process.

The transposing apparatus 100 determines whether the electromagnetic field analysis process has ended (step S1206). If the electromagnetic field analysis process has not ended yet (step S1206: NO), the transposing apparatus 100 returns to step S1108 of FIG. 11.

If the electromagnetic field analysis process has ended (step S1206: YES), the transposing apparatus 100 transmits a notice of the end of the electromagnetic field analysis process to the user terminal 201 (step S1207), and ends the electromagnetic field analysis process.

The user terminal 201 determines whether the electromagnetic field analysis process has ended (step S1208). If the electromagnetic field analysis process has not ended yet (step S1208: NO), the user terminal 201 returns to step S1110 of FIG. 11. When the electromagnetic field analysis process has ended (step S1208: YES), the user terminal 201 ends the electromagnetic field analysis process. In this manner, the electromagnetic field analyzing system 200 executes the electromagnetic field analysis of the analysis space A and outputs the value of the electromagnetic filed in the analysis space A.

A procedure of the transposing process by the transposing apparatus 100 of the working example 1 will be described in detail, referring to FIG. 13. The transposing process is the process indicated by step S1003 of FIG. 10.

As depicted in FIG. 13, the transposing apparatus 100 determines whether number-of-lattice information indicative of the numbers of lattices in respective directions V1 to V3 of the analysis space A has been input to transposing apparatus 100 (step S1301). If the number-of-lattice information has not been input (step S1301: NO), the transposing apparatus 100 returns to step S1301 and waits for input of the number-of-lattice information.

If the number-of-lattice information has been input (step S1301: YES), the transposing apparatus 100 identifies the greatest number of lattices, the middle number of lattices, and the least number of lattices among the numbers of lattices in respective directions V1 to V3 (step S1302). The transposing apparatus 100 sets the greatest number of lattices to a variable X, the middle number of lattices to a variable Y, and least number of lattices to a variable Z (step S1303).

Figure 14:
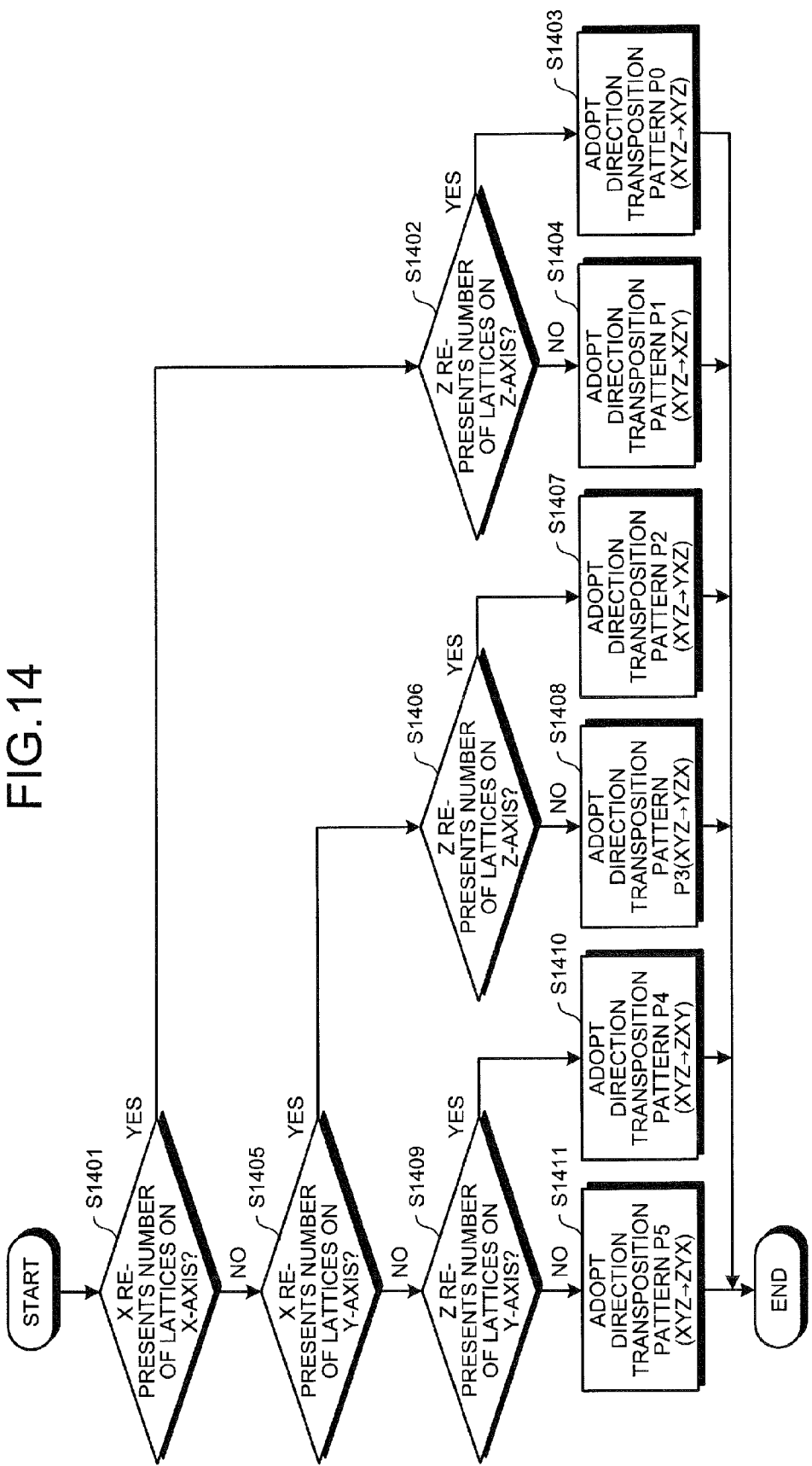
FIG. 14 is a flowchart of a procedure of direction transposition pattern determining process by the transposing apparatus 100.

The transposing apparatus 100 executes a direction transposition pattern determining process depicted in FIG. 14 to determine a direction transposition pattern (step S1304). The transposing apparatus 100 exchanges variables in respective axial directions according to the determined direction transposition pattern (step S1305), after which the transposing apparatus 100 ends the transposing process.

Through this process, the transposing apparatus 100 increases the processing volume for the electromagnetic field analysis on the X-axis direction in which the computing elements PE performs efficient calculation, and reduces the processing volume for the electromagnetic field analysis along the directions of the Y-axis and the Z-axis. The computing elements PE also reduces the time consumed for the electromagnetic field analysis of the post-transposition analysis space A to a period shorter than the time consumed for the electromagnetic field analysis of the pre-transposition analysis space A and averages processing volumes of computing elements PE.

A procedure of the direction transposition pattern determining process by the transposing apparatus 100 will be described in detail, referring to FIG. 14.

FIG. 14 is a flowchart of the detailed procedure of the direction transposition pattern determining process by the transposing apparatus 100. As depicted in FIG. 14, the transposing apparatus 100 determines whether a number set to the variable X represents the number of lattices on the X-axis (step S1401). If the number set to the variable X represents the number of lattices on the X-axis (step S1401: YES), the transposing apparatus 100 determines whether a number set to the variable Z represents the number of lattices on the Z-axis (step S1402).

If the number set to the variable Z represents the number of lattices on the Z-axis (step S1402: YES), the transposing apparatus 100 adopts a direction transposition pattern P0 (step S1403). The transposing apparatus 100 ends the direction transposition pattern determining process.

If the number set to the variable Z does not represent the number of lattices on the Z-axis (step S1402: NO), the transposing apparatus 100 adopts a direction transposition pattern P1 (step S1404). The transposing apparatus 100 ends the direction transposition pattern determining process.

If the number set to the variable X does not represent the number of lattices on the X-axis at step S1401 (step S1401: NO), the transposing apparatus 100 determines whether the number set to the variable X represents the number of lattices on the Y-axis (step S1405). If the number set to the variable X represents the number of lattices on the Y-axis (step S1405: YES), the transposing apparatus 100 determines whether the number set to the variable Z represents the number of lattices on the Z-axis (step S1406).

If the number set to the variable Z represents the number of lattices on the Z-axis (step S1406: YES), the transposing apparatus 100 adopts a direction transposition pattern P2 (step S1407). The transposing apparatus 100 ends the direction transposition pattern determining process.

If the number set to the variable Z does not represent the number of lattices on the Z-axis (step S1406: NO), the transposing apparatus 100 adopts a direction transposition pattern P3 (step S1408). The transposing apparatus 100 ends the direction transposition pattern determining process.

If the number set to the variable X does not represent the number of lattices on the Y-axis at step S1405 (step S1405: NO), the transposing apparatus 100 determines whether the number set to the variable Z represents the number of lattices on the Y-axis (step S1409).

If the number set to the variable Z represents the number of lattices on the Y-axis (step S1409: YES), the transposing apparatus 100 adopts a direction transposition pattern P4 (step S1410). The transposing apparatus 100 ends the direction transposition pattern determining process.

If the number set to the variable Z does not represent the number of lattices on the Y-axis (step S1409: NO), the transposing apparatus 100 adopts a direction transposition pattern P5 (step S1411). The transposing apparatus 100 ends the direction transposition pattern determining process. Through this procedure, the transposing apparatus 100 can determine which directions of the analysis space A are to be exchanged.

A working example 2 of transposition of data of the analysis space A by the transposing apparatus 100 will be described, referring to FIGS. 15 and 16. The working example 2 is an example in which the unit spaces B of the analysis space A are transposed so that the utilization efficiency of the computing elements PE is improved.

FIGS. 15 and 16 are explanatory diagrams of the working example 2 of transposition of data of the analysis space A by the transposing apparatus 100. In FIG. 15, the numbers of lattices in respective directions V1 to V3 of the analysis space A are "3, 2, 2", and the direction V1, direction V2, and direction V3 match the x-axis direction, Y-axis direction, and Z-axis direction, respectively. The numbers of lattices in respective axial directions are, therefore, "3, 2, 2". Multiple computing elements PE are arranged into a "4-line/3-column" two-dimensional matrix formation. It is assumed the row direction and the column direction of the matrix of computing elements PE correspond to the Y-axis direction and the Z-axis direction, respectively.

The transposing apparatus 100 transposes data of the analysis space A so that a direction in which the size of the analysis space A is the greatest becomes the axial direction corresponding to a direction in which the number of lined-up computing elements PE is larger among the row direction and the column direction of multiple of computing elements PE. The transposing apparatus 100 then transposes data of the analysis space A so that the direction in which the size of the analysis space A is the least becomes the axial direction corresponding to the direction in which the number of lined-up computing elements PE is smaller among the row direction and the column direction of the multiple computing elements PE. The transposing apparatus 100 then divides the post-transposition analysis space A by lattices having cells corresponding to the arrangement position of the computing elements PE, and causes each computing element PE to execute the electromagnetic field analysis of a space present in the corresponding cell.

The transposing apparatus 100 identifies, for example, the greatest number of lattices "3" among the numbers of lattices "3, 2, 2" in respective directions V1 to V3 of the analysis space A and thereby, identifies the direction V1 in which the number of lattices is the greatest. The transposing apparatus 100 then identifies the Y-axis direction in which the identified direction V1 corresponds to the direction in which the number of lined-up computing elements PE is larger among the row direction and the column direction of the multiple computing elements PE. The transposing apparatus 100 exchanges variables for the electromagnetic field along the direction V1, for variables for the electromagnetic field along the direction V2 matching the Y-axis direction so that the identified direction V1 becomes the identified Y-axis direction and thereby, transposes data of the analysis space A.

The transposing apparatus 100 identifies the least number of lattices "2" among the numbers of lattices "2, 3, 3" in respective directions V1 to V3 of the post-transposition analysis space A and thus, identifies the direction V3 in which the number of lattices is the least. The transposing apparatus 100 transposes data of the analysis space A so that the identified direction V3 becomes the Z-axis direction corresponding to the direction in which the number of lined-up computing elements PE is smaller among the row direction and the column direction of the multiple computing elements PE. In FIG. 15, the direction V3 matches the Z-axis direction, so that the data of the analysis space A is not transposed in the direction V3. As a result, transposing apparatus 100 transposes the data of the analysis space A in which the numbers of lattices in respective axial directions of the three-dimensional coordinate system are "3, 2, 2" into data of the analysis space A in which the numbers of lattices in respective axial directions of the three-dimensional coordinate system are "2, 3, 2".

The transposing apparatus 100 divides the post-transposition analysis space A by lattices having cells corresponding to the arrangement positions of the computing elements PE into spaces in the divided cells. The transposing apparatus 100 assigns a space in each cell corresponding to the arrangement position of each computing element PE, to each computing element PE and causes the computing element PE to execute the electromagnetic field analysis of the assigned space.

For example, the transposing apparatus 100 divides the analysis space A in which the numbers of lattices in respective axial directions are "2, 3, 2" into 6 spaces with the numbers of lattices of "2, 1, 1" so that the divided spaces correspond to the arrangement position of a "4-line/3-column" matrix of the computing elements PE. The transposing apparatus 100 then assigns a space corresponding to the arrangement position of each computing element PE, to each computing element PE and causes the computing element PE to execute the electromagnetic field analysis of the assigned space.

Through this process, the transposing apparatus 100 increases the processing volume for the electromagnetic field analysis on the X-axis direction in which the computing elements PE performs efficient calculation, and reduces the processing volume for the electromagnetic field analysis along the directions of the Y-axis and the Z-axis. As a result, the computing elements PE can reduce the time required for the analysis of the post-transposition analysis space A to a period shorter than the time required for the electromagnetic field analysis of the pre-transposition analysis space A.

Before the transposition, the transposing apparatus 100 divides the analysis space A into 4 spaces, assigns 4 spaces to 4 computing elements PE among 12 computing elements PE, and causes each computing element PE to execute the electromagnetic field analysis. After the transposition, the transposing apparatus 100 divides the analysis space A into 6 spaces, assigns 6 spaces to 6 computing elements PE among 12 computing elements PE, and causes each computing element PE to execute the electromagnetic field analysis. As a result, the transposing apparatus 100 increases the number of computing elements PE to be used and thereby, averages processing volumes of the computing elements PE and improves the utilization efficiency of the computing elements PE.

In FIG. 16, the numbers of lattices in respective directions V1 to V3 of the analysis space A are "6, 8, 2", and the direction V1, direction V2, and direction V3 match the x-axis direction, Y-axis direction, and Z-axis direction, respectively. The numbers of lattices in respective axial directions are, therefore, "6, 8, 2". Multiple computing elements PE are arranged into a "4-line/3-column" two-dimensional matrix formation. It is assumed the row direction and the column direction of the matrix of computing elements PE correspond to the Y-axis direction and the Z-axis direction, respectively.

The transposing apparatus 100 identifies either a direction in which the size of the analysis space A is the greatest or a direction in which size of the analysis space A is a middle size, as a direction close to a direction in which the number of lined-up computing elements PE is larger among the row direction and the column direction of the multiple computing elements PE. The transposing apparatus 100 then transposes data of the analysis space A so that the identified direction becomes the axial direction corresponding to the direction in which the number of lined-up computing elements PE is larger.

The transposing apparatus 100 then identifies a direction in which the size of the analysis space A is the least or the direction in which size of the analysis space A is the middle size, as a direction close to a direction in which the number of lined-up computing elements PE is smaller among the row direction and the column direction of the multiple computing elements PE. The transposing apparatus 100 transposes data of the analysis space A so that the identified direction becomes the axial direction corresponding to the direction in which the number of lined-up computing elements PE is smaller. The transposing apparatus 100 divides the post-transposition analysis space A by lattices each having a cell corresponding to the arrangement position of each of the computing elements PE, and causes each computing element PE to execute the electromagnetic field analysis of a space present in the divided cell.

The transposing apparatus 100, for example, identifies the greatest number of lattices "8", the middle number of lattices "6", and the least number of lattices "2" among the numbers of lattices "6, 8, 2" in respective directions V1 to V3 of the analysis space A. The transposing apparatus 100 then transposes data of the analysis space A so that the direction V1 in which the number of lattices is "6", which is close to the number of lined-up computing elements PE "4" in the row direction among the greatest number of lattices "8" and the middle number of lattices "6", becomes the Y-axis direction.

The transposing apparatus 100 then transposes data of the analysis space A so that the direction V3, which is not transposed into the Y-axis direction and in which the number of lattices is "2" close to the number of lined-up computing elements PE "3" in the column direction among the middle number of lattices "6" and the least number of lattices "2", becomes the Z-axis direction. In FIG. 16, the direction V3 matches the Z-axis direction, so that the data of the analysis space A is not transposed in the direction V3. As a result, transposing apparatus 100 transposes the data of the analysis space A in which the numbers of lattices in respective axial directions of the three-dimensional coordinate system are "6, 8, 2" into data of the analysis space A in which the numbers of lattices in respective axial directions of the three-dimensional coordinate system are "8, 6, 2".

The transposing apparatus 100 divides the post-transposition analysis space A by lattices having cells corresponding to the arrangement positions of the computing elements PE into spaces in the divided cells. The transposing apparatus 100 assigns a space in each cell corresponding to the arrangement position of each computing element PE, to each computing element PE and causes the computing element PE to execute the electromagnetic field analysis of the assigned space.

For example, the transposing apparatus 100 divides the analysis space A in which the numbers of lattices in respective axial directions are "8, 6, 2" into 8 spaces with the numbers of lattices of "6, 2, 1" so that the divided spaces correspond to the arrangement position of a "4-line/3-column" matrix of the computing elements PE. The transposing apparatus 100 then assigns a space corresponding to the arrangement position of each computing element PE, to each computing element PE and causes the computing element PE to execute the electromagnetic field analysis of the assigned space.

Through this process, the transposing apparatus 100 increases the processing volume for the electromagnetic field analysis on the X-axis direction in which the computing elements PE performs efficient calculation, and reduces the processing volume for the electromagnetic field analysis along the directions of the Y-axis and the Z-axis. As a result, the computing elements PE can reduce the time consumed for the analysis of the post-transposition analysis space A to a period shorter than the time consumed for the electromagnetic field analysis of the pre-transposition analysis space A. Reducing the time consumed for the analysis of the post-transposition analysis space A to a period shorter than the time consumed for the electromagnetic field analysis of the pre-transposition analysis space A, the transposing apparatus 100 also averages processing volumes of the computing elements PE.

A procedure of the electromagnetic field analysis process according to the working example 2 will be described in detail. The electromagnetic field analysis process of the working example 2 is the same as the electromagnetic field analysis process of the working example 1 described referring to FIGS. 10 to 12. The description of the electromagnetic field analysis process of the working example 2 is, therefore, omitted.

A procedure of the transposing process by the transposing apparatus 100 according to the working example 2 will be described in detail, referring to FIG. 17. The transposing process is the process indicated by step S1003 of FIG. 10.

FIG. 17 is a flowchart of a procedure of the transposing process by the transposing apparatus 100 according to the working example 2. As depicted in FIG. 17, the transposing apparatus 100 determines whether number-of-lattice information has been input to transposing apparatus 100 (step S1701). If the number-of-lattice information has not been input (step S1701: NO), the transposing apparatus 100 returns to step S1701 and waits for input of the number-of-lattice information.

If the number-of-lattice information has been input (step S1701: YES), the transposing apparatus 100 identifies the greatest number of lattices, the middle number of lattices, and the least number of lattices among the numbers of lattices in respective axial directions (step S1702).

The transposing apparatus 100 determines if the least number of lattices is equal to or larger than the number of lined-up computing elements Py in the row direction (step S1703). If the least number of lattices is equal to or larger than the number of lined-up computing elements Py in the row direction (step S1703: YES), the transposing apparatus 100 sets the greatest number of lattices to the variable X, the middle number of lattices to the variable Y, and the least number of lattices to the variable Z (step S1704). The transposing apparatus 100 then proceeds to step S1711.

If the least number of lattices is not equal to or larger than the number of lined-up computing elements Py in the row direction (step S1703: NO), the transposing apparatus 100 determines if the greatest number of lattices is equal to or smaller than the number of lined-up computing elements Pz in the column direction (step S1705). If the greatest number of lattices is equal to or smaller than the number of lined-up computing elements Pz in the column direction (step S1705: YES), the transposing apparatus 100 sets the least number of lattices to the variable X, the middle number of lattices to the variable Y, and the greatest number of lattices to the variable Z (step S1706). The transposing apparatus 100 proceeds to step S1711.

If the greatest number of lattices is not equal to or smaller than the number of computing elements Pz in the column direction (step S1705: NO), the transposing apparatus 100 calculates Lmax by dividing the greatest number of lattices by the number of lined-up computing elements Py in the row direction and calculates Lmid by dividing the middle number of lattices by the number of lined-up computing elements Py in the row direction. The transposing apparatus 100 also calculates Mmid by dividing the middle number of lattices by the number of lined-up computing elements Pz in the column direction and calculates Mmin by dividing the least number of lattices by the number of lined-up computing elements Pz in the column direction (step S1707).

Subsequently, the transposing apparatus 100, among Lmax or Lmid which are the number of lattices, selects that which is closer to 1, and sets the selected number of lattices to the variable Y (step S1708). The transposing apparatus 100 selects Mmid or Mmin that is the number of lattices closer to 1, and sets the selected number of lattices to the variable Z (step S1709). The transposing apparatus 100 sets the remaining number of lattices to the variable X (step S1710), and proceeds to step S1711.

At step S1711, the transposing apparatus 100 executes the direction transposition pattern determining process of FIG. 14 to determine direction transposition patterns (step S1711). The transposing apparatus 100 exchanges variables for individual axial directions according to the determined direction transposition patterns (step S1712) and thereafter, the transposing apparatus 100 ends the transposing process.

Through this process, the transposing apparatus 100 increases a processing volume for the electromagnetic field analysis on the X-axis direction in which the computing elements PE performs efficient calculation, and reduces the processing volume for the electromagnetic field analysis along the directions of the Y-axis and the Z-axis. The transposing apparatus 100 reduces the time consumed for the analysis of the post-transposition analysis space A to a period shorter than the time consumed for the electromagnetic field analysis of the pre-transposition analysis space A and also averages processing volumes of the computing elements PE.

As described, the transposing apparatus 100 transposes data of the analysis space A so that the direction of the analysis space A in which the number of lattices is the greatest becomes the direction of the axis in which the analysis space A is not divided, among directions of respective axes of the three-dimensional rectangular coordinate system. Through this process, the transposing apparatus 100 increases the processing volume for the electromagnetic field analysis on the X-axis direction in which the computing elements PE performs efficient calculation, and reduces the processing volume for the electromagnetic field analysis along the directions of the Y-axis and the Z-axis. As a result, the computing elements PE can reduce the time consumed for the analysis of the post-transposition analysis space A to a period shorter than the time consumed for the electromagnetic field analysis of the pre-transposition analysis space A.

The transposing apparatus 100 transposes data of the analysis space A so that the direction of the analysis space A in which the number of lattices is the least becomes the direction of the axis corresponding to a direction in which the number of lined-up computing elements PE is the least among the row direction and the column direction of the computing elements PE, among directions of respective axes of the three-dimensional rectangular coordinate system. Through this process, the transposing apparatus 100 reduces the time consumed for the analysis of the post-transposition analysis space A to a period shorter than the time consumed for the electromagnetic field analysis of the pre-transposition analysis space A and also averages processing volumes of the computing elements PE.

The transposing apparatus 100 transposes data of the analysis space A so that the direction of the analysis space A in which the number of lattices is the greatest becomes the direction of the axis corresponding to a direction in which the number of lined-up computing elements PE is the greatest among the row direction and the column direction of the computing elements PE, among directions of respective axes of the three-dimensional rectangular coordinate system. The transposing apparatus 100 also transposes data of the analysis space A so that the direction of the analysis space A in which the number of lattices is the least becomes the direction of the axis in which the analysis space A is not divided, among directions of respective axes of the three-dimensional rectangular coordinate system.

Through this process, the transposing apparatus 100 increases the processing volume for the electromagnetic field analysis on the X-axis direction in which the computing elements PE performs efficient calculation, and reduces the processing volume for the electromagnetic field analysis along the directions of the Y-axis and the Z-axis. As a result, the transposing apparatus 100 can reduce the time consumed for the analysis of the post-transposition analysis space A to a period shorter than the time consumed for the electromagnetic field analysis of the pre-transposition analysis space A. Reducing the time consumed for the analysis of the post-transposition analysis space A to a period shorter than the time consumed for the electromagnetic field analysis of the pre-transposition analysis space A, transposing apparatus 100 also averages processing volumes of the computing elements PE.

The transposing apparatus 100 identifies a direction in which the number of lattices is close to the greatest number of lined-up computing elements PE among the numbers of the lined-up computing elements PE in the row direction and the column direction, among the greatest number of lattices and the middle number of lattices. The transposing apparatus 100 then transposes data of the analysis space A so that the identified direction becomes the direction of the axis corresponding to a direction in which the number of lined-up computing elements PE is the greatest among the row direction and the column direction of the computing elements PE, among directions of respective axes of the three-dimensional rectangular coordinate system.

The transposing apparatus 100 identifies a direction in which the number of lattices is close to the least number of lined-up computing elements PE among the numbers of the lined-up computing elements PE in the row direction and the column direction, among the least number of lattices and the middle number of lattices. The transposing apparatus 100 transposes data of the analysis space A so that the identified direction becomes the direction of the axis corresponding to a direction in which the number of lined-up computing elements PE is the least among the row direction and the column direction of the computing elements PE, among directions of respective axes of the three-dimensional rectangular coordinate system.

Through this process, the transposing apparatus 100 increases the processing volume for the electromagnetic field analysis on the X-axis direction in which the computing elements PE performs efficient calculation, and reduces the processing volume for the electromagnetic field analysis along the directions of the Y-axis and the Z-axis. As a result, the transposing apparatus 100 can reduce the time consumed for the analysis of the post-transposition analysis space A to a period shorter than the time consumed for the electromagnetic field analysis of the pre-transposition analysis space A. Reducing the time consumed for the analysis of the post-transposition analysis space A to a period shorter than the time consumed for the electromagnetic field analysis of the pre-transposition analysis space A, transposing apparatus 100 also averages processing volumes of the computing elements PE.

The transposing method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The transposing apparatus 100 described in the present embodiment can be realized by an application specific integrated circuit (ASIC) such as a standard cell or a structured ASIC, or a programmable logic device (PLD) such as a field-programmable gate array (FPGA). Specifically, for example, functional units (detecting unit 401, transposing unit 402, and output unit 403) of the transposing apparatus 100 are defined in hardware description language (HDL), which is logically synthesized and applied to the ASIC, the PLD, etc., thereby enabling fabrication of the transposing apparatus.

According to one aspect of the present invention, improved efficiency of electromagnetic field analysis is achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transposing apparatus comprising a computer that controls a computing device having a plurality of computing elements arranged into a matrix formation and memory devices each connected to each computing element, the computing device executing an electromagnetic field analysis process on latticed three-dimensional analysis subject data present in a three-dimensional coordinate system, the computer configured to:

detect a number of lined-up lattices in a direction of a first axis of the three-dimensional coordinate system, a number of lined-up lattices in a direction of a second axis of the coordinate system, and a number of lined-up lattices in a direction of a third axis of the coordinate system, through detection on the three-dimensional analysis subject data;

transpose a group of lattices of the three-dimensional analysis subject data, based on the detected numbers of lined-up lattices and on a number of lined-up computing elements in a row direction and a number of lined-up computing elements in a column direction among the computing elements, when a least number of lined-up lattices among the respective numbers of lattices is larger than the number of lined-up computing elements in the row direction and the number of lined-up computing elements in the column direction, so that a direction of a lineup of lattices of the three-dimensional analysis subject data in which a number of lattices is greatest becomes a direction of an axis not corresponding to the row direction or the column direction, among directions of the first axis, the second axis, and the third axis, and a direction of a lineup of lattices of the three-dimensional analysis subject data in which a number of lattices is least becomes a direction of an axis corresponding to a lineup direction in which the number of lined-up computing elements is least among the number of lined-up computing elements in the row direction and the number of lined-up computing elements in the column direction, among directions of the first axis, the second axis, and the third axis; and output to the computing device, the transposed group of lattices of the three-dimensional analysis subject data.

2. The transposing apparatus according to claim 1, wherein
   the computer transposes a group of lattices of the three-dimensional analysis subject data so that a direction of a lineup of lattices of the three-dimensional analysis subject data in which number of lattices is least becomes a direction of an axis not corresponding to the row direction or the column direction, among directions of the first axis, the second axis, and the third axis.

3. The transposing apparatus according to claim 1, wherein
   the computer, when a first number of lined-up computing elements selected as a larger number of computing elements among the number of grouped computing elements in the row direction and the number of grouped computing elements in the column direction is larger than the least number of lined-up lattices among the respective numbers of lined-up lattices and a second number of lined-up computing elements selected as a smaller number of computing elements among the number grouped computing elements in the row direction and the number of grouped computing elements in the column direction is smaller than the greatest number of lined-up lattices among the respective numbers of lined-up lattices, transposes a group of lattices of the three-dimensional analysis subject data so that a direction of a lineup of lattices of the three-dimensional analysis subject data becomes a direction of an axis corresponding to a lineup direction in which computing elements of the first number of lined-up computing elements are lined up, among directions of the first axis, the second axis, and the third axis, the number of the lineup of lattices being the number of lined-up lattices close to the first number of lined-up computing elements among the greatest number of lined-up lattices and a middle number of lined-up lattices equal to or less than the greatest number of lined-up lattices and equal to or larger than the least number of lined-up lattices.

4. The transposing apparatus according to claim 3, wherein
   the computer transposes a group of lattices of the three-dimensional analysis subject data so that a direction of a lineup of lattices of the three-dimensional analysis subject data becomes a direction of an axis corresponding to a lineup direction in which computing elements of the second number of lined-up computing elements are lined up, among directions of the first axis, the second axis, and the third axis, the number of the lineup of lattices being the number of lined-up lattices close to the second number of lined-up computing elements among the middle number of lined-up lattices and the least number of lined-up lattices.

5. The transposing apparatus according to claim 1, wherein
   the computer, when the greatest number of lined-up lattices among the respective numbers of lattices is smaller than the number of lined-up computing elements in the row direction and the number of lined-up computing elements in the column direction, transposes a group of lattices of the three-dimensional analysis subject data so that a direction of a lineup of lattices of the three-dimensional analysis subject data in which the number of lattices is greatest becomes a direction of an axis corresponding to a lineup direction in which the number of lined-up computing elements is greatest among the number of lined-up computing elements in the row direction and the number of lined-up computing elements in the column direction, among directions of the first axis, the second axis, and the third axis.

6. A transposing method executed by a computer that controls a computing device having a plurality of computing elements arranged into a matrix formation and memory devices each connected to each computing element, the computing device executing an electromagnetic field analysis process on latticed three-dimensional analysis subject data present in a three-dimensional coordinate system, the transposing method comprising:

detecting a number of lined-up lattices in a direction of a first axis of the three-dimensional coordinate system, a number of lined-up lattices in a direction of a second axis of the coordinate system, and a number of lined-up lattices in a direction of a third axis of the coordinate system, through detection on the three-dimensional analysis subject data;

transposing a group of lattices of the three-dimensional analysis subject data, based on the detected numbers of lined-up lattices and on a number of lined-up computing elements in a row direction and a number of lined-up computing elements in a column direction among the computing elements, when a least number of lined-up lattices among the respective numbers of lattices is larger than the number of lined-up computing elements in the row direction and the number of lined-up computing elements in the column direction, so that a direction of a lineup of lattices of the three-dimensional analysis subject data in which a number of lattices is greatest becomes a direction of an axis corresponding to the row direction or the column direction, among directions of the first axis, the second axis, and the third axis;

transposing the group of lattices of the three-dimensional analysis subject data so that a direction of a lineup of lattices of the three-dimensional analysis subject data in which a number of lattices is least becomes a direction of an axis corresponding to a lineup direction in which the number of lined-up computing elements is least among the number of lined-up computing elements in the row direction and the number of lined-up computing elements in the column direction, among directions of the first axis, the second axis, and the third axis; and outputting to the computing device, the transposed group of lattices of the three-dimensional analysis subject data.

7. A computer-readable recording medium storing a transposing program causing a computer that controls a computing device having a plurality of computing elements arranged into a matrix formation and memory devices each connected to each computing element, the computing device executing an electromagnetic field analysis process on latticed three-dimensional analysis subject data present in a three-dimensional coordinate system, to execute a process comprising:

detecting a number of lined-up lattices in a direction of a first axis of the three-dimensional coordinate system, a number of lined-up lattices in a direction of a second axis of the coordinate system, and a number of lined-up lattices in a direction of a third axis of the coordinate system, through detection on the three-dimensional analysis subject data;

transposing a group of lattices of the three-dimensional analysis subject data, based on the detected numbers of lined-up lattices and on a number of lined-up computing elements in a row direction and a number of lined-up computing elements in a column direction among the computing elements, when a least number of lined-up lattices among the respective numbers of lattices is larger than the number of lined-up computing elements in the row direction and the number of lined-up computing elements in the column direction, so that a direction of a lineup of lattices of the three-dimensional analysis subject data in which a number of lattices is greatest becomes a direction of an axis corresponding to the row direction or the column direction, among directions of the first axis, the second axis, and the third axis transposing the group of lattices of the three-dimensional analysis subject data so that a direction of a lineup of lattices of the three-dimensional analysis subject data in which a number of lattices is least becomes a direction of an axis corresponding to a lineup direction in which the number of lined-up computing elements is least among the number of lined-up computing elements in the row direction and the number of lined-up computing elements in the column direction, among directions of the first axis, the second axis, and the third axis; and outputting to the computing device, the transposed group of lattices of the three-dimensional analysis subject data.

* * * * *